United States Patent
Kim et al.

(10) Patent No.: US 8,751,318 B2
(45) Date of Patent: Jun. 10, 2014

(54) METHOD FOR MANAGING AND/OR CONTROLLING STORE AND SYSTEM FOR THE SAME

(75) Inventors: Uniyoung Kim, Seoul (KR); Saehun Jang, Seoul (KR); Gangseub Lee, Seoul (KR); Hyungnam Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 25 days.

(21) Appl. No.: 13/483,969

(22) Filed: May 30, 2012

(65) Prior Publication Data
US 2012/0310744 A1    Dec. 6, 2012

(30) Foreign Application Priority Data

May 30, 2011    (KR) .................. 10-2011-0051238
Jun. 3, 2011    (KR) .................. 10-2011-0053793

(51) Int. Cl.
*G06G 1/12*    (2006.01)
*G06Q 30/00*    (2012.01)

(52) U.S. Cl.
USPC .............................................. 705/21; 725/22

(58) Field of Classification Search
USPC ........................................................ 705/21
See application file for complete search history.

(56) References Cited

U.S. PATENT DOCUMENTS

| | | | | |
|---|---|---|---|---|
| 7,830,259 | B2 * | 11/2010 | Walker et al. | 340/572.1 |
| 7,937,723 | B2 * | 5/2011 | Weissmueller et al. | 725/22 |
| 8,172,096 | B2 * | 5/2012 | Van De Steen | 211/119.003 |

* cited by examiner

*Primary Examiner* — Garcia Ade
(74) *Attorney, Agent, or Firm* — Birch, Stewart, Kolasch & Birch, LLP

(57) ABSTRACT

A method for managing and controlling a store and a system for the same are disclosed. The system includes a digital display shelf being provided with a recognition unit configured to recognize a product displayed on the shelf and an output unit configured to output information on the recognized product, a digital signage display configured to output data respective to the recognized product, and a managing system configured to communicate with the digital display shelf and the digital signage display so as to transmit control data and to receive processing data. Herein, the data respective to the recognized product may include at least one of audio data, video data, and text data configured to advertise and promote the corresponding product. And, the managing system may include a database related to the data respective to the recognized product.

20 Claims, 36 Drawing Sheets

FIG. 2
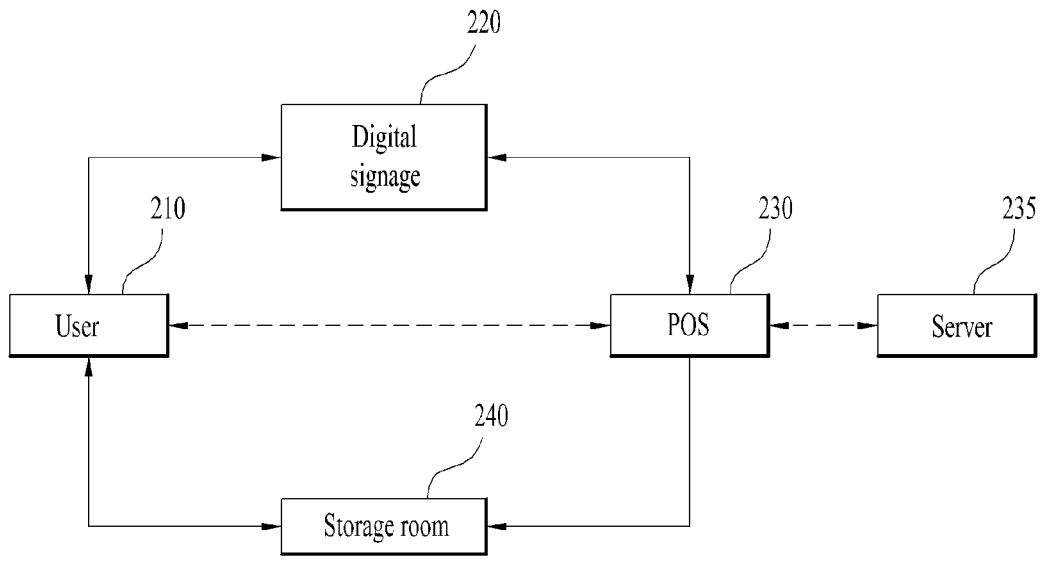
(a)
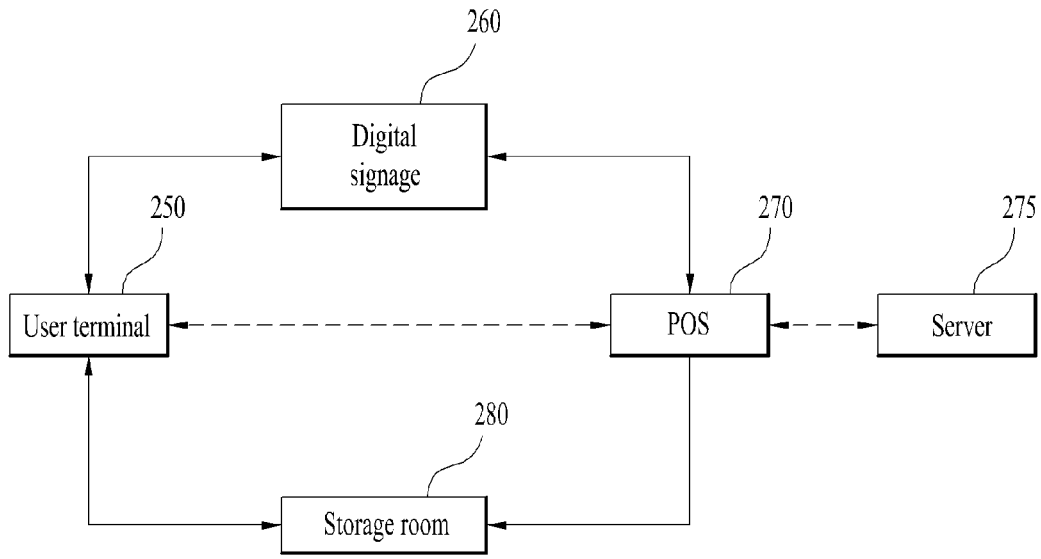
(b)

FIG. 10

| | Purchase power | Preferred products |
|---|---|---|
| Customer A | Rank 1 | No. 1 Priority: Product a, No. 2 Priority: Product b |
| Customer B | Rank 2 | No. 1 Priority: Product c, No. 2 Priority: Product d |
| Customer C | Rank 3 | No. 1 Priority: Product e, No. 2 Priority: Product f |
| . . . | . . . | . . . |

FIG. 11

| | Purchase power | Preferred products |
|---|---|---|
| Group X | Rank 1 | No. 1 Priority: Product m, No. 2 Priority: Product n |
| Group Y | Rank 2 | No. 1 Priority: Product o, No. 2 Priority: Product p |
| Group Z | Rank 3 | No. 1 Priority: Product q, No. 2 Priority: Product r |
| . . . | . . . | . . . |

FIG. 14
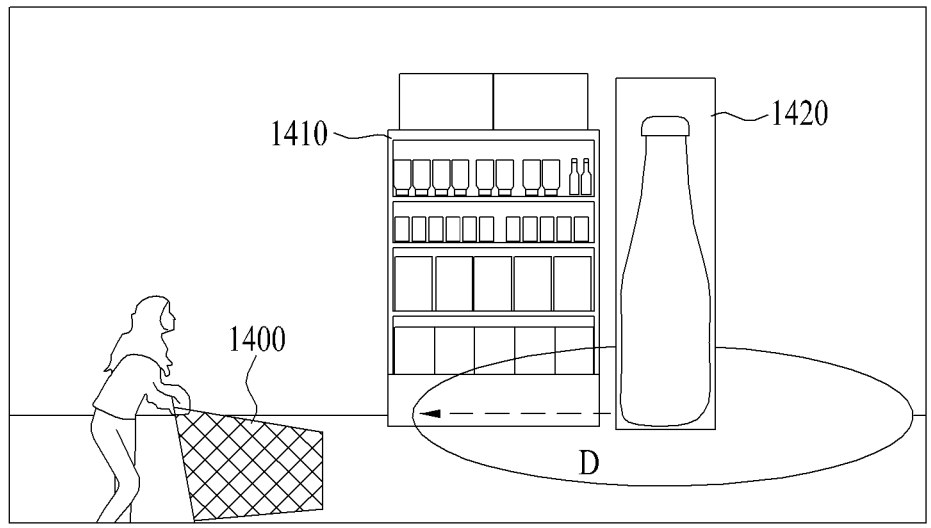
(a)
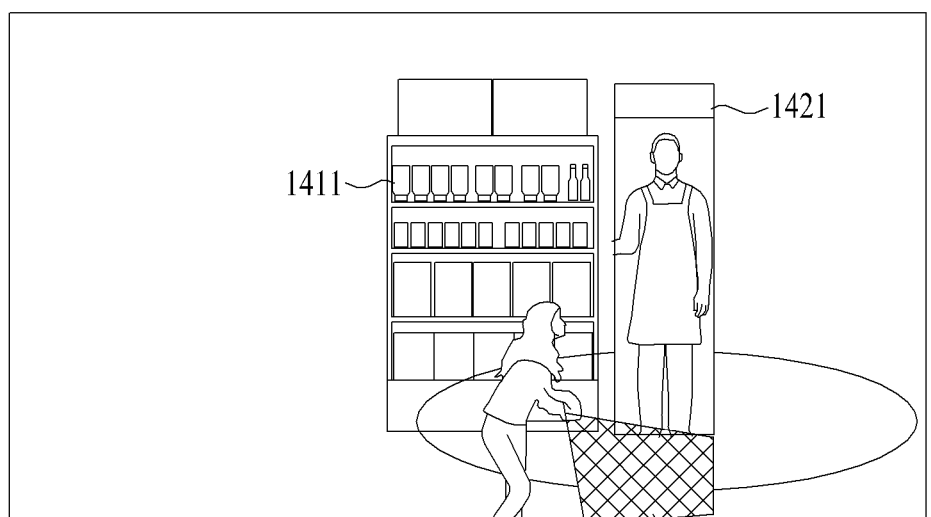
(b)

FIG. 26

| Total Number of People in the Store \ Multi-system | Air-conditioner | Lighting | Audio Device |
|---|---|---|---|
| N or more | Mode 1 | Mode 3 | Mode 5 |
| Less than N | Mode 2 | Mode 4 | Mode 6 |

FIG. 27

| Total Number of People in the Store \ Multi-system | Air-conditioner | Lighting | Audio Device |
|---|---|---|---|
| N or more | 23℃ | RED | Pop Music |
| Less than N | 25℃ | BLUE | Classic |

METHOD FOR MANAGING AND/OR CONTROLLING STORE AND SYSTEM FOR THE SAME

This application claims the benefit of the Korean Patent Application No. 10-2011-0051238, filed on May 30, 2011, and the Korean Patent Application No. 10-2011-0053793, filed on Jun. 3, 2011, which are hereby incorporated by reference as if fully set forth herein.

BACKGROUND OF THE INVENTION

1. Field of the Invention

The present invention relates to digital devices used in stores (or supermarkets) and, more particularly, to a method for managing and/or controlling a store and a system for the same enabling products to be automatically recognized through a digital interface that is provided in stores and also enabling information on such recognized products to be automatically outputted.

2. Discussion of the Related Art

Generally, there exist two different methods for purchasing one or more specific products. One method corresponds to having a purchaser (i.e., user) access an on-line store over the Internet, fill out a purchase order for one or more specific products selected by the purchaser, so that the purchaser can receive the purchased product(s) via off-line after a predetermined period of time. Meanwhile, another method corresponds to having a purchaser visit a traditional marketplace (or street market) and purchase one or more specific products selected by the purchaser, thereby immediately acquiring the purchased items. Most particularly, the second method may be advantageous in that the purchaser can verify the actual products in person, select one or more wanted products, load the selected products in his (or her) shopping cart, thereby purchasing the selected products.

However, in the related art supermarket environment, problems occurred in providing fixed services to the users (or customers) regardless of the change in the users who are present in supermarket. Additionally, the related art supermarket environment disadvantageous in that, a considerable amount of maintenance cost may occur due to the large number of employees, who provide guidance services to the customers. Also, in case of department stores or large wholesale stores, a wide range of products are on display, and the consumption cycle (or expenditure cycle) of the customers (or consumers) is short. Therefore, in this case, a considerable amount of man power and maintenance cost may be required in order to manually replace and rearrange each of the products that are displayed on display shelves and to manually display information related to each of the corresponding products. In this case, difficulties may also occur in managing the store itself. Furthermore, in case of using manpower, newly changed or updated sales information may fail to be provided to the customers in real-time, thereby confusing the customers.

SUMMARY OF THE INVENTION

Accordingly, the present invention is directed to a method for managing and/or controlling a store and a system for the same that substantially obviate one or more problems due to limitations and disadvantages of the related art.

An object of the present invention is to provide a method for managing a store and a system for the same that can automatically recognize products and the positioning and alignment of each product within a store through a digital interface, and that can output data related to the recognized products.

Another object of the present invention is to provide a solution that can analyze users present (or positioned) in a store (or supermarket), and that cab automatically adjust (or control) the state of a multi-system provided in the store accordingly.

Another object of the present invention is to provide a system that can output optimized information in accordance with the movement of the user, who consistently repositions himself (or herself) within the store (or supermarket).

A further object of the present invention is to define and provide a protocol that can minimize the number of managers within the store, and that can enable a customer to quickly access information to which users want.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a system for controlling a store includes a digital display shelf being provided with a recognition unit configured to recognize a product displayed on the shelf and an output unit configured to output information on the recognized product, a digital signage display configured to output data respective to the recognized product, and a managing system configured to communicate with the digital display shelf and the digital signage display so as to transmit control data and to receive processing data. Herein, the data respective to the recognized product may include at least one of audio data, video data, and text data configured to advertise and promote the corresponding product. And, the managing system may include a database related to the data respective to the recognized product. The system for controlling a store may further include a server configured to communicate with the digital display shelf, the digital signage display, and the managing system, so as to transmit and receive data to and from the digital display shelf, the digital signage display, and the managing system.

According to another aspect of the present invention, in a method for managing a store that can recognize a specific product and output information on the recognized product through a digital interface, the digital interface being included in a system for controlling a store, the method for managing a store includes the steps of recognizing a product assigned to the digital interface, receiving data related to the recognized product, decoding the received data related to the recognized product, and outputting the decoded data related to the recognized product to a predetermined area (or region) respective to the corresponding product. Herein, the data related to the recognized product may include at least one of audio data, video data, and text data configured for advertising and promoting the corresponding product. And, the data related to the recognized product may be extracted from a database of the system for controlling the store.

According to yet another aspect of the present invention, in a method for controlling a server, which is configured to control at least one or more display devices located within a store, the controlling method of the server includes the steps of receiving information on users each using at least one or more mobile devices located in a first section (or region), accessing a memory having user-specific or user group-specific purchase pattern information stored therein, generating a command signal providing guidance on a specific product, based upon the purchase pattern information, and transmitting the generated command signal providing guidance on a specific product to a display device located in the first section (or region).

According to yet another aspect of the present invention, a recording medium readable by a computer, the computer having data for executing the method of the present invention recorded in the recording medium.

According to a further aspect of the present invention, in a display device located within a store, the display device includes a display module configured to display first mode data, a sensor configured to sense whether or not a random mobile device is located within a predetermined range of the display device, a conversion module configured to convert from the first mode data to second mode data, when the random mobile device is located within a predetermined range of the display device, a reception module configured to receive a command signal respective to a specific product, a memory configured to store guidance information on at least one or more products, a memory controller configured to access the memory and to extract guidance information corresponding to the specific product, and a controller configured to control the display device, so that the display device can display third mode data, wherein the third mode data includes graphic data indicating the extracted guidance information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates an example of a store controlling system according to the present invention;

FIG. 10 illustrates a database storing information related to customer-basis purchase patterns according to an exemplary embodiment of the present invention;

FIG. 11 illustrates a database storing information related to group-basis purchase patterns according to an exemplary embodiment of the present invention;

FIG. 14 illustrates a method of a display device for detecting a specific customer;

FIG. 26 illustrates an exemplary data format that is used by a server for controlling a multi-system according to an exemplary embodiment of the present invention;

FIG. 27 illustrates another exemplary data format that is used by a server for controlling a multi-system according to an exemplary embodiment of the present invention;

DETAILED DESCRIPTION OF THE INVENTION

Figure 1:
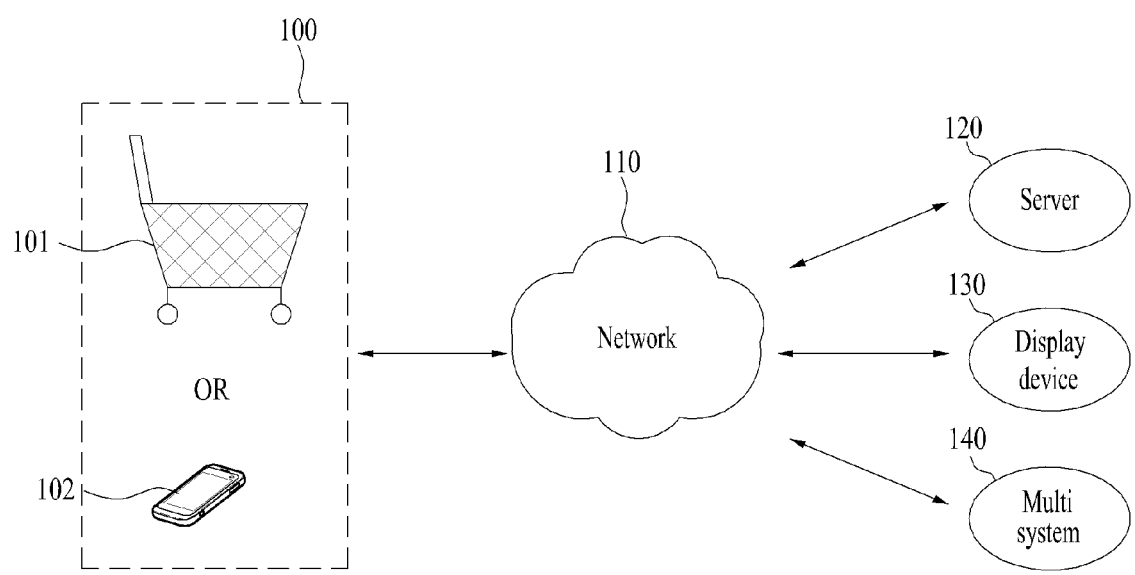
FIG. 1 illustrates a general view of an overall system according to an exemplary embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

The suffixes "module" and "unit" that are mentioned in the elements used to describe the present invention are merely used for the purpose of simplifying the description of the present invention. Therefore, the suffixes "module" and "unit" may also be alternately used for the reference of a specific element of the present invention.

Reference will now be made in detail to the preferred embodiments of the present invention, examples of which are illustrated in the accompanying drawings. However, the embodiment of the present invention described below may be modified to a wide range of modifications. And, therefore, it should be understood that the present invention will not be limited only to the example presented in the description of the present invention set forth herein.

Although the terms used in the present invention are selected from generally known and used terms, the terms used herein may be varied or modified in accordance with the intentions or practice of anyone skilled in the art, or along with the advent of a new technology. Alternatively, in some particular cases, some of the terms mentioned in the description of the present invention may be selected by the applicant at his or her discretion, the detailed meanings of which are described in relevant parts of the description herein. Furthermore, it is required that the present invention is understood not simply by the actual terms used but by the meaning of each term lying within.

Hereinafter, in the description of the present invention, digital devices that are used in stores according to the present invention and, more particularly, a method for controlling stores and a system for the same enabling a user or a user terminal to purchase and receive a wanted product through a digital interface and/or a managing system within the store, will now be described in detail.

Accordingly, in the description of the present invention, the term "user terminal" is used to refer to all terminals equipped with a communication module, which is capable of performing wireless or wired communication. Examples of such user terminal may include user-owned mobile phones, smart phones, and tablet personal computers (PCs), and also store-owned terminals (or user equipments). Most particularly, the user terminal according to the present invention may refer to a terminal that can communicate with a digital interface and/or a managing system. And, whenever required, the user terminal according to the present invention may download an application or software enabling the user terminal to perform communication with the digital interface and/or managing system, to perform data exchange, and to perform payment processes.

Also, a "digital shelf (or digital display shelf)" is used to refer to all types of shelves including a digital device and being capable of recognizing products that are placed thereon and capable of outputting information related to the recognized products. Most particularly, in the description of the present invention, a shelf capable of automatically recognizing products placed thereon through a product detecting sensor according to the present invention, and digitally displaying and providing price information on the recognized products in the form of electronic price tags (E-price tags) will be given as an example of the digital shelf according to the present invention. Hereinafter, in the description of the present invention, the term "digital shelf (or digital display shelf)" will also be referred to as a "smart shelf".

Additionally, a "digital signage display (or digital signage)" refers to all types of digital devices capable of performing interfacing with a user or user terminal so as to perform processing and/or to output process results in connection with the managing system, and/or capable of being operated in connection with the above-described smart shelf. Herein, the digital signage display may perform interfacing by adopting a touch interface, such as a touch-screen or a touch-pad, and/or by adopting a non-touch interface, such as a remote controller or a pointer, for the user or user terminal. Furthermore, the digital signage display may be provided with an operating system (OS), which is required for being in connection with a user or user terminal and/or a managing system and/or for communicating with the user or user terminal and/or the managing system.

Hereinafter, the smart-shelf and the digital signage display may be collectively referred to as a digital interface and described accordingly for simplicity of the description of the present invention. Also, the relation and connection between the smart-shelf and the digital signage display within such digital interface and the functions and operations of the smart-shelf and the digital signage display will be described in more detail later on with reference to the accompanying drawings. And, therefore, the description of the same will be omitted in this part of the description.

Furthermore, the term "managing system" collectively refers to all types of systems performing control operations for processing product purchasing procedures of each user as well as performing the overall store management. Herein, the term "managing system" will be used to refer to a managing system for controlling stores according to the present invention. Meanwhile, in addition to the concept of controlling the stores according to the present invention, the managing system may also be used as a concept of a system for managing the entire store. In the description of the present invention, a Point of Sales (POS) comprising a terminal, a store controller, a host computer, and so on, will be given as an example of the managing system.

Finally, in the description of the present invention, an output and a display will not only refer to the output of images and video data including such images, but will also refer to concurrent or non-concurrent provision (or output and display) of the related audio data or text data.

Hereinafter, the present invention will be described in more detail with reference to the accompanying drawings.

FIG. 1 illustrates a general view of an overall system according to an exemplary embodiment of the present invention.

According to an exemplary embodiment of the present invention, a system for controlling a store may comprise a digital display shelf being provided with a recognition unit configured to recognize a product displayed on the shelf and an output unit configured to output information on the recognized product, a digital signage display configured to output data respective to the recognized product, and a managing system configured to communicate with the digital display shelf and the digital signage display so as to transmit control data and to receive processing data, wherein the data respective to the recognized product includes at least one of audio data, video data, and text data configured to advertise and promote the corresponding product, and wherein the managing system includes a database related to the data respective to the recognized product.

The system may further comprise a server configured to communicate with the digital display shelf, the digital signage display, and the managing system, so as to transmit and receive data to and from the digital display shelf, the digital signage display, and the managing system. The digital display shelf can further comprise a communication module configured to support wireless and/or wired communication and to transmit and/or receive data.

The recognition unit can include a detection sensor configured to sense a weight of a predetermined section of the digital display shelf, and communicate with the managing system, so as to receive product data respective to the sensed weight, thereby recognizing the corresponding product. The recognition unit can include a camera sensor or an infrared sensor configured to acquire an image of the product positioned in a predetermined section of the digital display shelf, and communicate with the managing system, so as to receive product data corresponding to the acquired image, thereby recognizing the corresponding product. The recognition unit can include a sensor configured to acquire an image of the product positioned in a predetermined section of the digital display shelf, and communicate with the managing system, so as to receive product data respective to the sensed weight and corresponding to the acquired image, thereby recognizing the corresponding product.

The output unit can be configured to communicate with the managing system so as to receive electronic-price tag information, which is recognized by the recognition unit, and to output the received information to a predetermined section of the digital display shelf respective to the corresponding product in a text data format.

The digital signage display can comprise a communication module configured to support wired and/or wireless communication and to transmit and/or receive data, a decoding unit configured to decode data received from the managing system and the digital display shelf through the communication module, and a display unit. The digital signage display can be divided into a plurality of predetermined sections, in row or column units, based upon a method of positioning products on the digital display shelf, and output data respective to at least one of the products displayed on a digital display shelf corresponding to each of the plurality of predetermined divided sections. The digital signage display can communicate with a user terminal of a user being recognized within a predetermined range, so as to receive at least one of customer information and purchase list information, and output data respective to at least one of the products recognized by the digital display shelf, based upon the received at least one of customer information and purchase list information, or outputs data respective to a related product received from the managing system.

An exemplary embodiment of the present invention, a display device located within a store may comprise a display module configured to display first mode data, a sensor configured to sense whether or not a random mobile device is located within a predetermined range of the display device, a conversion module configured to convert from the first mode data to second mode data, when the random mobile device is located within a predetermined range of the display device, a reception module configured to receive a command signal respective to a specific product, a memory configured to store guidance information on at least one or more products, a memory controller configured to access the memory and to extract guidance information corresponding to the specific product, and a controller configured to control the display device, so that the display device display third mode data, wherein the first mode data is related to a basic or main screen, the second mode data is related to corresponding section which located the display device, and the third mode data is related to the specific product and includes graphic data containing the extracted guidance information.

The display device can further comprise a voice detector configured to detect a voice of a user of the mobile device, and a voice recognition unit configured to translate the detected voice. And, the display device can further comprise a voice converter configured to convert the extracted guidance information to audio data, and a voice output unit configured to output the converted audio data.

The controller can perform control operations enabling first graphic data and second graphic data to be displayed. The first graphic data indicates information on a specific location within the store in which the specific product is located. And, the second graphic data indicates a manual providing guidance to the specific product.

The sensor can correspond to any one of an infrared sensor, a Radio Frequency Identification (RFID) sensor, and a Near Field Communication (NFC) sensor. And, the sensor can be designed to perform infrared communication with a digital card fixed to a shopping cart. Also, the display device can correspond to a digital signage display located in a first section within the store.

Hereinafter, the general view of the overall system according to the present invention will now be described in detail with reference to FIG. 1. Meanwhile, the system shown in FIG. 1 may, for example, be applied in supermarkets where a wide range of products is displayed on shelves in each aisle.

As shown in FIG. 1, a mobile device 100, a server 120, a display device 130, and a multi-system 140 are inter-connected by a network 110. The network 110 may correspond to a wired network or a wireless network. And, herein, each element 100, 120, 130, and 140 may be inter-connected to one another through the same network, or may be inter-connected through different networks.

For example, the mobile device 100 performs data communication with the display device 130 via Wi-Fi or Bluetooth. And, the display device 130 performs data communication with the server 120 via wireless internet or RF. Furthermore, for example, the server 120 is designed to control the multi-system 140, which is connected to the server 120 via PLC (Power Line Communication).

The mobile device 100, for example, corresponds to a shopping cart 101 located in a corresponding supermarket or to a mobile phone 102 owned by a user (or customer) using a shopping cart. When data communication is realized between the shopping cart 101 or the mobile phone 102 and the display device 130, the system according to the present invention may be provided with information on the corresponding customer (or user), who is located within the supermarket. This will be described in more detail later on with reference to FIG. 12 and FIG. 13.

For example, the server 120 may correspond to a PC that is capable of controlling diverse devices located in the supermarket. The display device 130, for example, is positioned is each predetermined section within the supermarket. And, the display device 130 may be designed to be capable of providing advertisement or guidance information on a specific product to the customers. Herein, the display device 130 may also be referred to as a digital signage display.

Furthermore, the multi-system 140 refers to air-conditioners, lighting system, audio system, and so on, which are installed in the supermarket. Also, depending upon the conditions of the corresponding supermarket, the scope of the present invention may also include designing the system so that the server 120 can automatically control the multi-system 140. This will be described in more detail later on.

FIG. 2 illustrates an example of a store controlling system according to the present invention.

Herein, the system for controlling stores according to the present invention may further include other elements in addition to the structure shown in FIG. 2. More specifically, the present invention will not be limited only to the system structure shown in FIG. 2, and, as a general rule, the scope of the present invention shall be interpreted and understood based upon the appended claims of the present invention.

Most particularly, as shown in FIG. 2*a* and FIG. 2*b*, the method for controlling stores according to the present invention is configured by including digital interfaces 220 and 260 and POSs 230 and 270. However, although the digital interfaces 220 and 260 and the POSs 230 and 270 perform interfacing with the user 210, in FIG. 2a, the digital interfaces 220 and 260 and the POSs 230 and 270 perform interfacing with a user terminal (or user equipment) 250, in FIG. 2b.

Herein, as described above, the digital interfaces 220 and 260 may be used as elements including smart-shelves and digital signage displays. And, in some case, the digital interface may be interpreted as any one of the smart-shelve or the digital signage display.

An example of the digital interface, which is capable of communicating with the user or user terminal and with the managing system for managing and/or controlling the store, may include a communication module and a control module. More specifically, the communication module is configured to communicate with the user terminal and the managing system. And, the control module is configured to perform control operations so that information on the products being received from the managing system can be aligned in row or column units and outputted accordingly. And, when a specific product is selected, the control module is also configured to perform control operations so that information related to the user interface (UI) respective to the selected product can be outputted. At this point, the information on the product (or product information) may include at least one of video data, audio data, and text data. And, most particularly, the text data may include basic unit price information of the corresponding product.

Moreover, in addition to the structure shown in FIG. 2a and FIG. 2b, the system for controlling the store according to the present invention may further include storage rooms 240 and 280 and/or servers 235 and 275 receiving control signals (or commands) from the POSs 230 and 270, thereby providing the products that are stored therein.

Herein, the servers 235 and 275 may refer to all elements supporting the POSs 230 and 270 or the digital interface. For example, the servers 235 and 275 may correspond to any one of a payment server generating payment information or processing payment, a communication server providing a communication environment, an information server configuring product information or promotion information on a specific product in the form of a database, a product manufacturing server. Referring to FIG. 2a and FIG. 2b, although each of the servers 235 and 275 are illustrated as a single structure, the servers 235 and 275 may refer to any one of the above-described server types or may collectively refer to two or more of the above-described server types.

According to an exemplary embodiment of the present invention, a method of managing a store through a digital interface in a store controlling system may comprise recognizing a product assigned to the digital interface, receiving data related to the recognized product, decoding the received data related to the recognized product, and outputting the decoded data related to the recognized product to a predetermined area respective to the corresponding product, wherein the data related to the recognized product includes at least one of audio data, video data, and text data configured for advertising and promoting the corresponding product, and wherein the data related to the recognized product is extracted from a database of the store controlling system.

The recognizing a specific product can comprise sensing a weight of a predetermined area on the digital display shelf, and receiving product data respective to the sensed weight. And, the recognizing a specific product can comprise acquiring an image of a product located in a predetermined area on the digital display shelf, and receiving product data respective to the acquired image. Also, the recognizing a specific product can comprise sensing a weight of a predetermined area on the digital display shelf, acquiring an image of a product located in the predetermined area on the digital display shelf, and receiving product data respective to the sensed weight and the acquired image.

The product data can further include electronic-price tag data of the corresponding product. And, the E-price tag data of the corresponding product are received and outputted to a predetermined section respective to the corresponding product in a text data format. Also, the product data can further include electronic-price tag data of the corresponding product. The electronic-price tag data of the corresponding product can be outputted from the digital display shelf included in the digital interface as data related to the recognized product. And, advertisement and promotion data respective to the recognized product can be outputted from the digital signage display included in the digital interface. The product data can further include electronic-price tag data of the corresponding product, the digital signage display included in the digital interface being divided into a plurality of predetermined sections, in row or column units, based upon a method of positioning products on the digital display shelf. The digital signage display can output data respective to at least one of the products displayed on the digital display shelf corresponding to each of the plurality of predetermined divided sections.

The method can further comprise interfacing with a user terminal recognized within a predetermined range, receiving at least one of customer information and purchase list information from the interfaced user terminal, receiving data respective to a product being recognized by the digital display shelf, based upon at least one of the customer information and the purchase list information, or receiving data respective to a related product from the database, decoding the corresponding product data, and outputting the decoded product data.

According to an exemplary embodiment of the present invention, a method for controlling a server, which is configured to control at least one display devices located within a store, may comprise receiving information on user terminal located in a first section, extracting at least one of purchase list information from the received information and purchase pattern information from a memory, generating a command signal providing guidance on a specific product, based upon at least one of the purchase list information and the purchase pattern information, and transmitting the generated command signal providing guidance on the specific product to at least one of a user terminal and a display signage device which is located in the first section.

The receiving information on user terminal can be received from the display signage device being capable of collecting information from a digital card or a mobile device fixed to a shopping cart. And, the display signage device can be located in the first section.

The memory can include first address storing information on a type and a price of products previously purchased by a user, and second address storing information on a type and a price of products previously purchased by a user belonging to a specific user group.

The generating a command signal can further comprise analyzing what the user wants to purchase a specific product based upon at least one of the purchase list information and the purchase pattern information. And, the generating a command signal can further comprise analyzing users located in the first section and extracting a first user being assigned with a highest priority level, and generating a command signal providing guidance on a specific product corresponding to the extracted first user.

The transmitted command signal includes at least one of first graphic data and second graphic data, the first graphic data indicating information on a specific location within the store in which the specific product is located, and the second graphic data indicating a manual providing guidance to the specific product.

Figure 3:
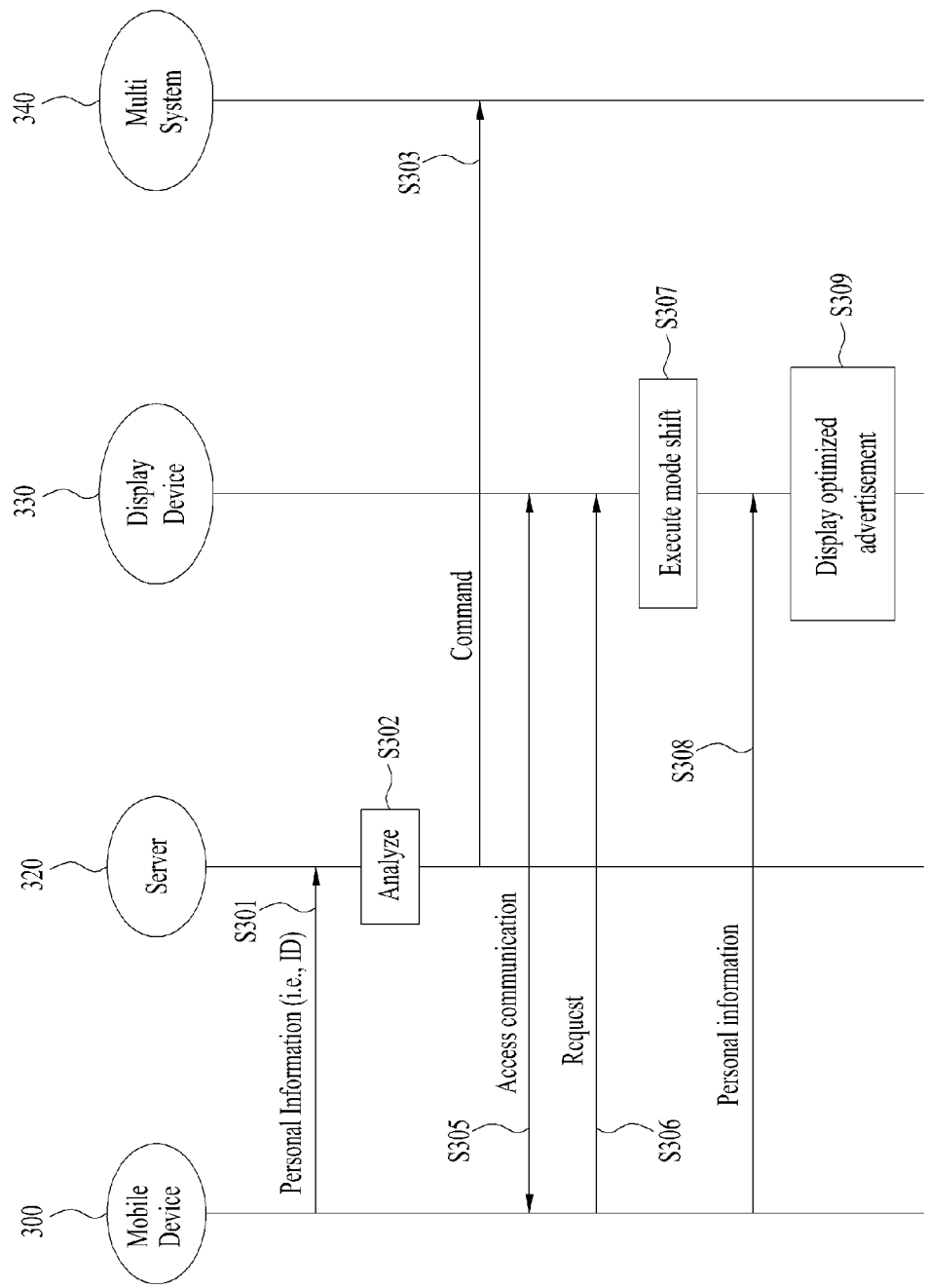
FIG. 3 illustrates a flow chart showing a data protocol between each device according to an exemplary embodiment of the present invention.

FIG. 3 illustrates a flow chart showing a data protocol between each device according to an exemplary embodiment of the present invention.

Hereinafter, data flow of the data being transmitted to and from the mobile device 300, the server 320, the display device 330, and the multi-system 340, which are all installed and/or located in the corresponding supermarket will now be described in detail.

The solutions that are proposed in the present invention may be divided into three different types. The first solution corresponds to an exemplary embodiment of automatically controlling the multi-system in accordance with the number of customers located in the supermarket. This will be described in more detail with reference to steps S301 to S304 of FIG. 3.

The second solution corresponds to an exemplary embodiment of a user interface quickly and accurately estimating the information, which is wanted by a customer, and notifying the estimated information to the corresponding customer. This will be described in more detail with reference to steps S305 to S307 of FIG. 3.

The third solution corresponds to an exemplary embodiment of analyzing a group of customers located in a specific region (or section) within the supermarket and providing the group of customers with optimized advertisement information. This will be described in more detail with reference to steps S308 and S309 of FIG. 3.

The first solution will now be described in detail. The mobile device 300 transmits personal information, such as an ID, to the server 320. Although FIG. 3 shows a process of directly transmitting data to the server, the scope of the present invention may also include transmitting data to the server 320, after having the data pass through the display device 330.

The server 320 analyzes a total number of customers located within the supermarket, by using the personal information received from the mobile device 300 (S302). Also, the server 320 uses the database (DB) so as to transmit another command signal to the multi-system 340 in accordance with the total number of customers. Additionally, based upon the command signal received from the server 320, the multi-system 340 is designed to control each device (S304). The above-described process steps S301 to S304 will be described in more detail later on with reference to FIG. 26 to FIG. 29.

Hereinafter, the second solution will now be described in detail. Herein, it will be assumed that the mobile device 300 and the display device 330 are connected to one another so that communication between the mobile device 300 and the display device 330 can be realized (S305). The connected communication of step S305 may be realized in accordance with an infrared signal, a Radio Frequency Identification (RFID) signal, Bluetooth or Near Field Communication (NFC). Also, the mobile device 300 transmits a signal requesting a change in a display mode to the display device 330 (S306). Thereafter, the display device 330 is designed to display the changed display mode (S307). Evidently, the scope of the present invention may also include designing the method according to the present invention by omitting step S306 and by performing step S307. The above-described process steps S305 to S307 will be described in more detail with reference to FIG. 12 to FIG. 16.

Finally, the third solution will now be described in detail. The mobile device 300 transmits personal information, such as an ID, to the display device 330 (S308). And, the display device 330 displays an optimized advertisement screen in accordance with the received personal information (S309). Evidently, although FIG. 3 only illustrates the process step S308, the scope of the present invention may also include the system to be designed to transmit the personal information to the server 320, after having the personal information pass through the display device 330, or to have the server 330 directly receive the personal information. The above-described process steps S308 and S309 will be described in more detail with reference to FIG. 8 to FIG. 11.

Meanwhile, although 3 different solutions have been described, the scope of the present invention may also include realizing another embodiment of the present invention by combining at least two or more of the above described solutions.

Hereinafter, a process of controlling a store including the process of purchasing products (or product purchasing process) in the system for controlling a store, shown in FIG. 1 and FIG. 2, will now be described in detail with reference to the accompanying drawings.

Figure 4:
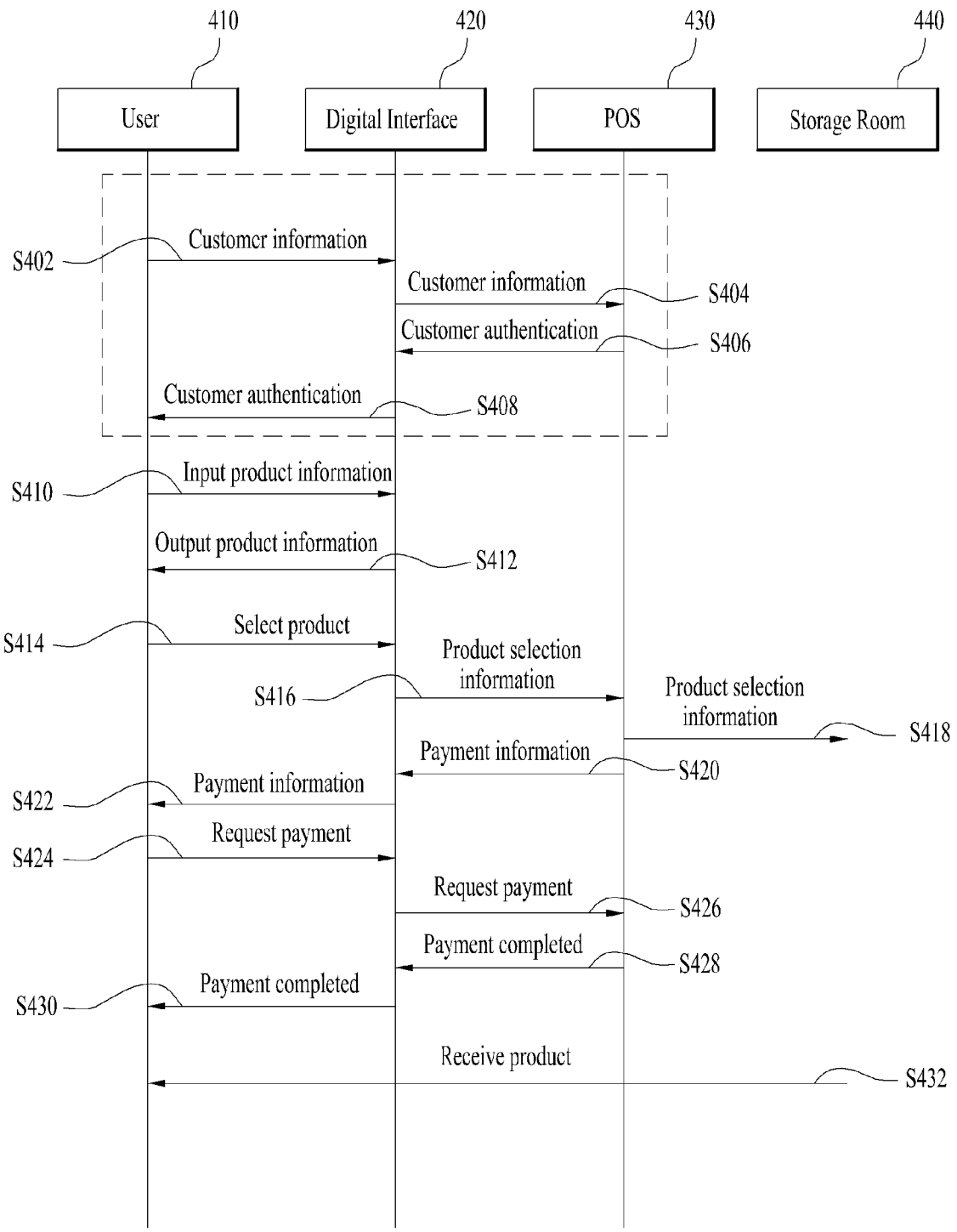
FIG. 4 illustrates an example of a store controlling method according to the present invention.
Figure 5:
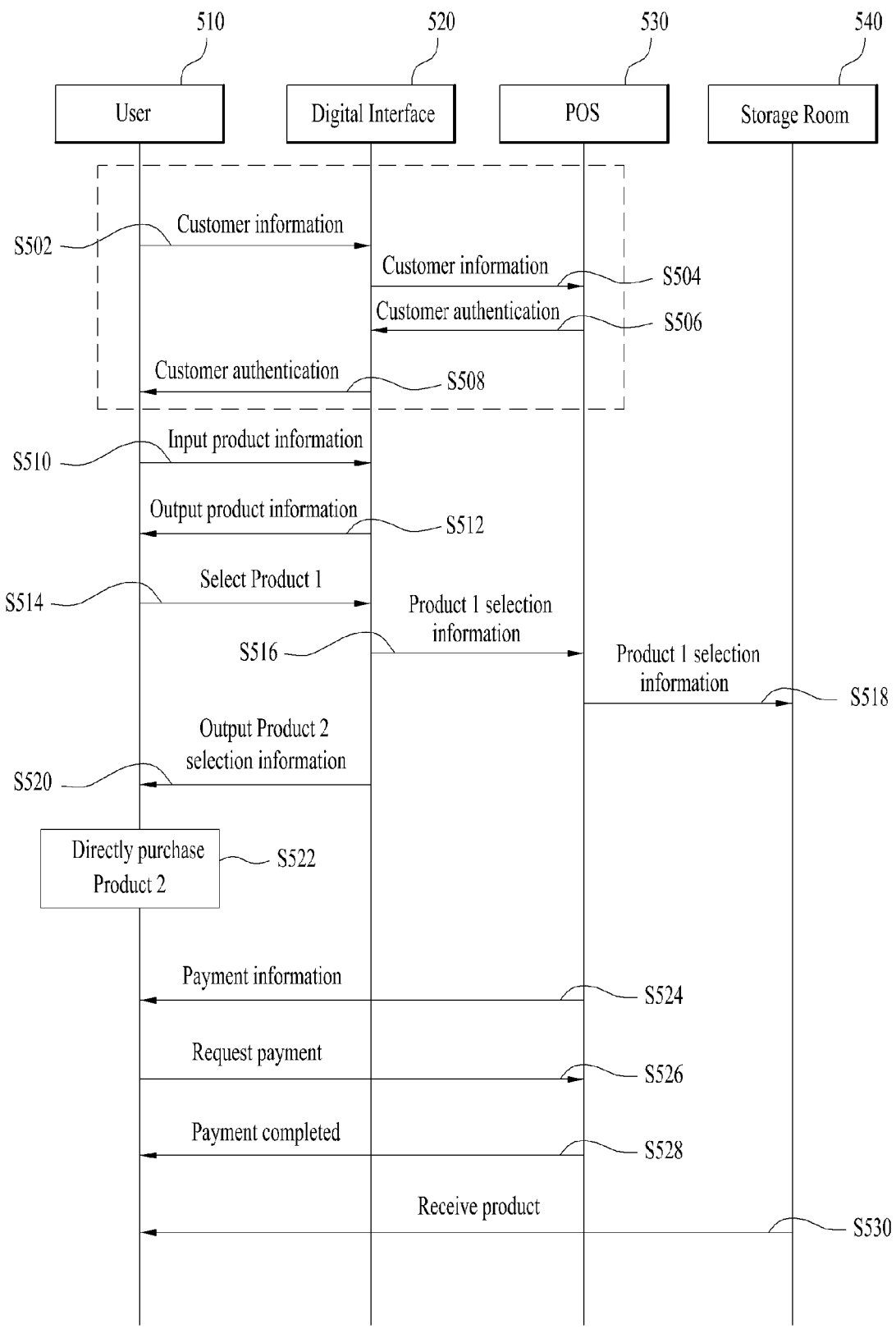
FIG. 5 illustrates another example of a store controlling method according to the present invention.

FIG. 4 illustrates an example of a store controlling method according to the present invention. And, FIG. 5 illustrates another example of a store controlling method according to the present invention.

According to the present invention, the user may broadly use two different types of payment methods for a purchased product within the supermarket, and such payment methods will be hereinafter described in detail. One of the methods corresponds to having the user 410 move (or relocate) himself (or herself) to and from shelves displaying products within the supermarket along with a shopping equipment, such as a shopping cart. Another method corresponds to using a digital interface 420 located in a predetermined space (or area) within the supermarket so that the user can move to the display shelf on which a wanted product is displayed, or so that the user can select and purchase a wanted product and process payment for the purchased product via the digital interface. Hereinafter, in the description of the present invention, the first method will be referred to as an offline purchasing method, and the second method will be referred to as an online purchasing method, for simplicity.

Herein, FIG. 4 most particularly described the online purchasing method according to the present invention. In other words, FIG. 4 illustrates an example of an online purchasing method performed by the user 410, and FIG. 5 illustrates an example of an online purchasing method and an offline purchasing method being performed in combination by the user 510.

First of all, an example of a method for controlling a store in association with an online purchasing method according to the present invention will be described in detail with reference to FIG. 4.

The user 410 first visits a store (or supermarket) and inputs customer information in a digital signage display 420 that is provided in the store (S402). Herein, the input of the customer information may be performed by having the user 410 directly (or personally) input the customer information by touching the digital interface 420. Alternatively, the user 410 may have his or her personal information (or customer information) registered in advance in the system of the corresponding store, and, then, the user 410 may tag a card, which carries the registered in formation and is assigned to the corresponding user, or a user equipment (or user terminal), which is registered to the system of the store, on the digital interface 420.

The digital interface 420 may, then, deliver the inputted customer information of the corresponding user 410 to the POS 430 (S404). And, the POS 430 authenticates the corresponding customer based upon the delivered customer information (S406 and S408).

Herein, for example, the authentication process determines whether the corresponding customer is a registered customer or a non-registered customer. Then, when it is determined that the corresponding customer is a non-registered customer, the authentication process may include a step of outputting data, which are required for performing the registration process, through the digital interface 420, so as to notify that the corresponding customer is required to be registered to the store, and a step of requesting additional information that is required for processing the registration process. Thereafter, when the user 410 provides the additional information required to perform registration, the authentication process may be further processed by having the digital interface 420 deliver the provided additional information to the POS 430, and by having the POS 430 perform the registration process of the corresponding customers. Then, once the registration process is completed, information indicating that the registration process has been successfully completed may be outputted through the digital interface 420.

The POS 430 generates a registration number assigned to the registered customer and also generates data for processing customer authentication in the future. Then, the POS 430 may provide the generated registration number and data to the user through the digital interface 420. Herein, when the identification information and the registration information of the registered customer is provided through the digital interface 420, as described above, information leakage may occur. Therefore, the corresponding information may also be provided by using a different means, such as the user's terminal or e-mail, based upon the provided information of the corresponding user 410.

Accordingly, in step S402, for example, the input of the customer information may be replaced with the input of identification information, which is assigned to the registered customer by the above-described POS 430.

Also, as described above, the user 410 may perform the initial customer registration process through the store's website over the Internet, which is separately provided by the POS 430, or the user 410 may perform the registration process through the digital interface 420.

Additionally, the digital interface 420 may also authenticate the customer. In this case, the digital interface 420 may directly perform the customer authentication process by downloading data or software, which are required for performing customer registration or customer authentication, from the POS 430 or the server.

In this case, the digital interface 420 may continue to periodically or aperiodically communicate with the POS 430 or the server, so as to update the customer-related data, thereby preventing any problem in the customer registration process or customer authentication process from occurring. Alternatively, the customer information may be updates to the digital interface 420, only when the customer information has been updated in the POS 430 or server.

The above-described process steps S402 to S408, i.e., the processes, such as customer authentication or customer verification, may also be performed in advance, regardless of the process of controlling the store, as a basic (or essential) procedure that is to be performed prior to the purchase of a specific product according to the present invention.

After performing step S408, the user 410 then performs an actual procedure for purchasing a product.

In other words, when the user 410 inputs information on the product(s) he or she wishes to purchase to the digital interface 420 (S410), the digital interface 420 outputs information respective to the wanted product(s) based upon the inputted information (S412).

Herein, for example, as an input means for inputting the product information respective to the product wanted by the user 410, the digital interface 420 may provide the corresponding information in a touch-type keyboard format. Alternatively, the digital interface 420 may provide a list of preferred items (or products) based upon a list of purchase history of the customer, who is certified in the above-described certification process.

In this case, by providing a list of preferred items based upon the customer's preference, i.e., by categorizing the corresponding products by a categorization order based upon the products that have recently been purchased most frequently, or by categorizing the corresponding products by a categorization order based upon the most frequently purchased items (or products), or by providing a list of preferred items based upon an alphabetical order (either Korean or English) based upon the most the digital interface 420, the user may be provided with simplicity and convenience in the user's input or selection.

Alternatively, when an icon or item representing a list of preferred products is provided in a predetermined area within a display screen, and when the user selects the corresponding icon or item, the digital interface 420 may provide a list of preferred products as described above.

Additionally, the digital interface 420 may also be provided with a separate icon or item representing a list of recommended products, so as to be capable of providing the customers with a list of special discount items (or products) or a list of items purchased by a large of customers on a particular day or during a particular time period in the corresponding store.

Furthermore, when the user uses the above described means so as to input a specific word, the digital interface 420 may provide a list of products related to the inputted word.

Accordingly, in providing a list of products related to information (or word) inputted by the user 410, the digital interface 420 may provide text format data, such as manufacturer of the corresponding product, name of the product, and so on, and the digital interface 420 may also provide detailed information on the selected product, such as image data of the selected product, location information of the display shelf displaying the selected product, and so on.

As described above, when the user 410 selects a specific product based upon the product information, which is being outputted from the digital interface 420 (S414), information on the selected product, i.e., product selection information is delivered to the POS 430 (S416).

At this point, when the user 410 selects a specific product, the digital interface 420 may provide the user with convenience in performing product selection by providing information on the price of the selected product, the number (or amount) of the selected product, and an estimated payment amount respective to the selected product.

The delivery of the product selection information from the digital interface 420 to the POS 430 may be performed in order to generate payment information, and the delivery of the product selection information may also be perform in order to deliver in advance information on the release (or distribution)

of the selected product from the storage room 440. Or, the delivery of the product selection information may be performed for both purposes.

However, the digital interface 420 may directly deliver the above-described product selection information to the storage room 440 without having to pass through the POS 430 so as to induce the release of the selected product. However, in this case, since a failure in processing the payment process may occur, and since a problem of theft may occur, it may be more preferable to release (or distribute) the selected product from the storage room 440, after the product selection information has passed through the POS 430, so that final information indicating payment completion can be received.

Also, the storage room 440 is designed to simply allow the user to receive one or more specific products, which have been selected and paid for via online shopping, from the POS 430 or another block, instead of allowing the user to directly (or personally) purchase one or more products and/or receive the purchased product(s) via offline shopping.

The POS 430 generates payment information based upon the product selection information of the user, which is transmitted from the digital interface 420 (S422). Herein, the payment information may be performed at the same time as the above-described step S420 or prior to step S420.

Also, in generating the payment information, the POS 430 may also generate the payment information in connection with a payment server.

The POS 430 may output the generated payment information through the digital interface 420 and may request for the processing of the payment process. In this case, the POS 430 or the digital interface 420 may provide information on categories of the products selected by the user and a number of the products selected by the user, payment amount respective to a corresponding item (or product), and total payment amount. And, the POS 430 or the digital interface 420 may also request for a payment means to be selected. Herein, the POS 430 or the digital interface 420 may request for the payment process to be processed based upon payment means information, which is pre-registered in the customer information, without having to select the payment means.

The user 410 may verify the payment information outputted to the digital interface 420 and may request for the payment process to be processed, after selecting the payment means or method of payment and after providing the information required to process payment (S424). Thereafter, the digital interface 420 may deliver the payment request made by the user 410 to the POS 430 (S426).

The POS 430 processes the payment process in accordance with the payment request made by the user 410. Herein, for example, the payment process may be performed by a communication between the POS 430 and an external payment server.

Once the payment process is completed, the POS 430 delivers the payment completion information to the digital interface 420 (S428). Then, the digital interface 420 outputs the delivered payment completion information and reports the completion of the payment process to the user 410 (S430).

Once the user 410 verifies the completion of the payment process through the digital interface 420, the user 410 receives the purchased product, which is released from the storage room 440, at a pre-arranged location (S432). Herein, the pre-arranged location may include, for example, the POS 430.

The description presented above corresponds to an exemplary case when the user may select a product and pay for the selected product through a plurality of digital interfaces 420 provided in the store and not in the POS 430, which correspond to a limited and fixed location for products that are not required to be verified and purchased in person by the user 410 via offline shopping.

Hereinafter, another exemplary method for controlling a store according to the present invention will be described in detail with reference to FIG. 5.

Unlike the method shown in FIG. 4, FIG. 5 illustrates a method for controlling a store according to the present invention, the method corresponding to a combination of an offline shopping method and an online shopping method.

In the following description, reference may be made to the description of FIG. 4 for any identical process steps, and, therefore, detailed description of the same will be omitted for simplicity.

First of all, since the customer certification and verification processes of steps S502 to S508 shown in FIG. 5 are identical to steps S402 to S408 shown in FIG. 4, reference may be made to the description of FIG. 4. And, therefore, detailed description of the same will be omitted from the description of FIG. 5 for simplicity.

Thereafter, the user 510 inputs product information (S510), and the digital interface 520 outputs the corresponding product information (S512).

The user 510 then selects a product based upon the product information outputted on the digital interface 520 (S514).

Herein, for example, in outputting the product information, the digital interface 520 may allow the user to select the corresponding product, or the digital interface 520 may allow the user to select online and/or offline purchase along with the product information.

Hereinafter, for example, a product selected by the user 510 via online purchase will be referred to as a first product, and a product selected by the user 510 via offline purchase will be referred to as a second product.

When the first product and the second product are selected through the digital interface 520, in step S514, the digital interface 520 delivers selection information on the first product and selection information on the second product to the POS 530 (S516).

Among the selection information on the first product and the selection information on the second product, the POS 530 delivers the selection information on the first product, which is related to the online purchase, to the storage room 540. Moreover, the POS 530 may generate payment information based upon the information on the selected first product and the information on the selected second product.

The digital interface 520 outputs information on the selected second product (S520). In this case, the user may provide location information indicating the sales location (or displayed location) of each product or may provide personal information or contact information of the personnel managing the display shelf of the related product. Also, whenever required, the digital interface 520 may output the above-described information in a printed format through an output device (e.g., printer), which is provided within the store, or which is provided in another location, and may provide the printed information to the customers (or users).

Subsequently, the user 510 directly purchases the second product (S522).

After the purchasing of the second product, the POS 530 either generates payment information or outputs the generated payment information, so as to request the payment process to be performed (S524).

When the user 510 verifies the outputted payment information and requests for the payment process to be carried out (S526), the POS 530 may directly carry out the payment process, or the POS 530 may communicate with an outside payment server, so as to carry out the payment process. Thereafter, when the payment process is carried out and completed, as described above, the POS 530 outputs payment completion information (S528). And, once the user 510 verifies the completion of the payment process, the user 510 then receives the purchased first product, which is released from the storage room 540, at a pre-arranged location (S432), thereby completing the process of purchasing a product.

In the above-described process, in step S514, when the information on the selected second product is different from the information of the second product, which is actually purchased from a display shelf, the user 510 may correspond to the purchase information on the second product through a near-by digital interface.

Also, the payment process of step S524 may also be carried out through the digital interface 520 instead of the POS 530.

The description presented above corresponds to an exemplary method of processing the purchase of a product, when the corresponding product is directly purchased by the user in person via offline shopping, in addition to when the corresponding product is purchased via online payment through the digital interface 520, and method for controlling the store.

Subsequently, FIG. 6 and FIG. 7 respectively illustrate other examples of a store controlling method according to the present invention.

Figure 6:
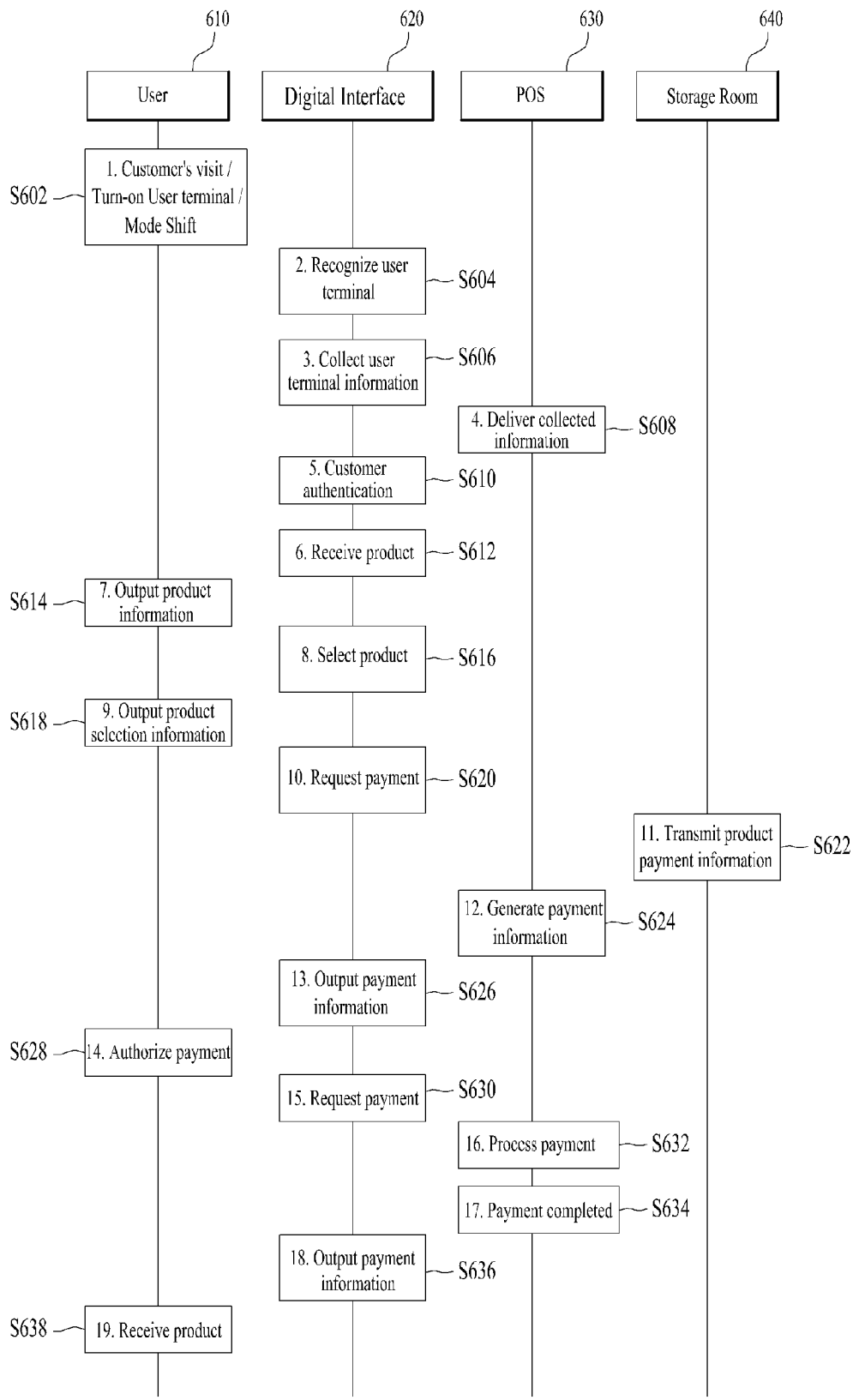
FIG. 6 illustrates yet another example of a store controlling method according to the present invention.

The example shown in FIG. 6 is similar to the online purchase method of FIG. 4. However, unlike the example of FIG. 4, the example of FIG. 6 corresponds to a case when a product is purchased through an online purchase method using a user equipment (or user terminal) personally owned by the user or provided by the corresponding store. And, the following description contains details on the processing of such purchase method and the process and method of controlling the same.

Figure 7:
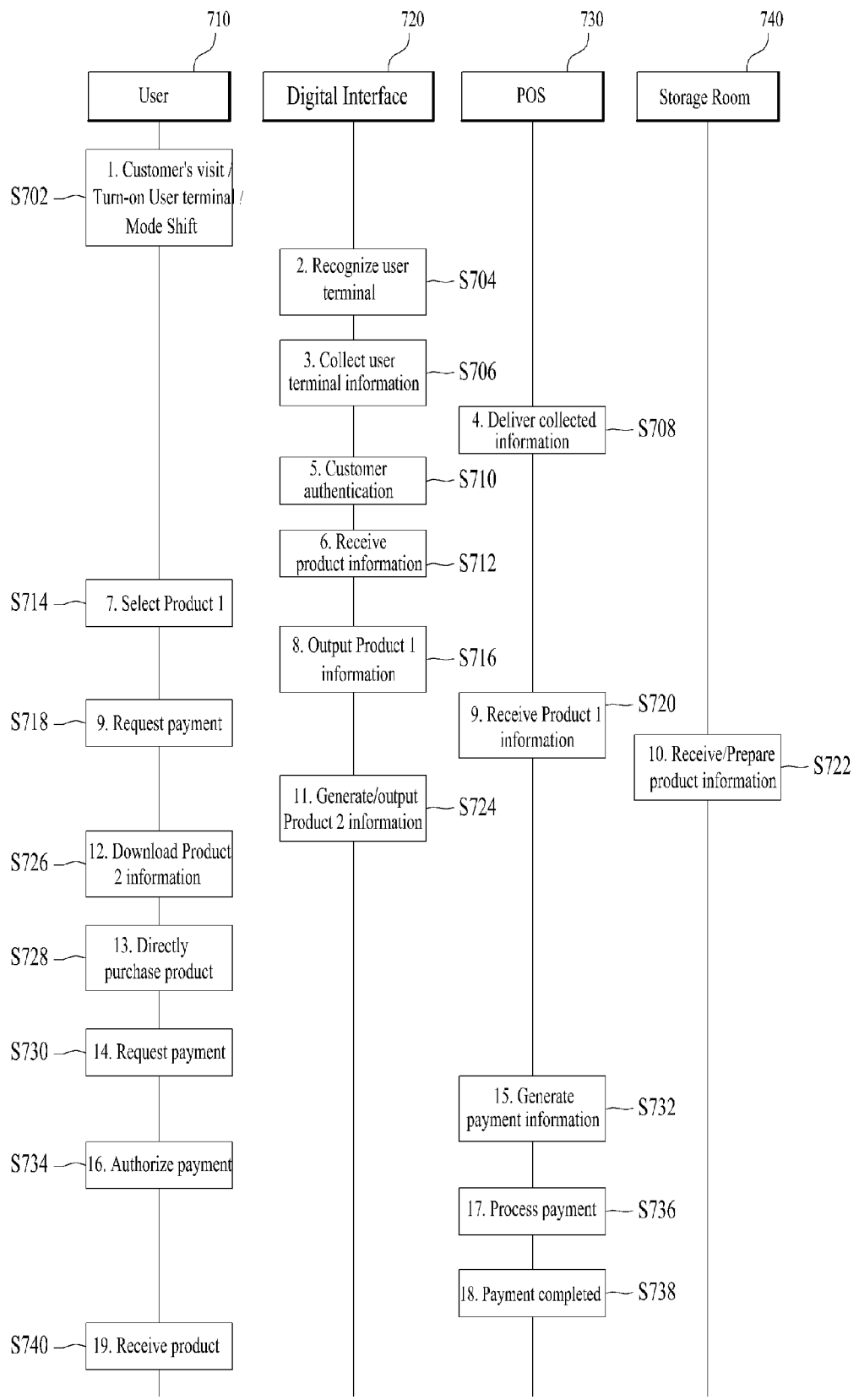
FIG. 7 illustrates a further example of a store controlling method according to the present invention.

Additionally, the example shown in FIG. 7 is similar to the method of purchasing a product by using a user terminal, as shown in FIG. 6. However, unlike the example of FIG. 6, the example of FIG. 7 corresponds to a case when the purchase method consists of a combination of an online purchase method and an offline purchase method. And, the following description contains details on the processing of such purchase method and the process and method of controlling the same.

In the following description, reference may be made to the description of FIG. 4 and FIG. 5 for any identical process steps, and, therefore, detailed description of the same will be omitted from FIG. 6 and FIG. 7 for simplicity.

When a user visits a store, and when the terminal 610 of the user (i.e., user terminal) is turned on, the digital interface 620 may recognize the terminal 610 of the user who is visiting the store (S602 and S604). In this case, whenever required, the user may change the operation mode of the user terminal 610 to an operation mode specifically dedicated to the store. Alternatively, the user may also be required to download an application, which is dedicated to be used in the corresponding store, through the internet or through a different means and, then, to execute the downloaded application.

Thereafter, the digital interface 620 may gather (or collect) customer information, user terminal information, and so on from the recognized user terminal 610 (S606), so as to deliver the gathered customer information, user terminal information, and so on to the POS 630 (S608).

Then, the POS 630 authenticates (or certifies) the customer information, user terminal information, and so on, which are delivered through the digital interface 620 (S610). Herein, since the operations of the POS 630 and the process steps related to the authentication (or certification) of the user and/ or the user terminal are identical to those described in FIG. 4 and FIG. 5, reference may be made to FIG. 4 and FIG. 5, and the detailed description of the same will be omitted for simplicity.

The POS 630 delivers the authentication result of the user terminal 610 to the digital interface 620, and, based upon the received authentication result, when the authentication is successful, the digital interface 620 accesses the corresponding user terminal 610 and receives product information (S612).

The digital interface 620 outputs the product information received from the user terminal 610, in step S612, to a display (or display screen) (S614), and, after verifying the product information outputted on the digital interface 620, the user may select a wanted (or desired) product (S616).

Thereafter, the digital interface 620 outputs the product information selected by the user (S618), and, after verifying the outputted information of step S618, the user requests for a payment process to be carried out (S620).

The digital interface 620 delivers paid product information to the POS 630 based upon the payment request made by the user (S622), and the POS 630 delivers the received paid product information to the storage room 640 and generates payment information based upon the paid product information.

The POS 630 delivers the generated payment information to the digital interface 620, and the digital interface 620 outputs the received payment information on a display screen (S626).

Subsequently, after verifying the payment information through the digital interface 620, the user authorizes the payment process (S628).

The digital interface 620 requests for the payment process to be carried out, in accordance with the payment authorization made by the user (S630), and, then, the POS 630 communicates with an external server in accordance with the request for carrying out payment made by the user, the request being delivered through the digital interface, so as to carry out the payment process (S632).

When the payment process is successfully carried out, and when the payment process is completed accordingly (S634), the POS 630 delivers the payment completion information to the digital interface 620.

After receiving the payment completion information from the POS 630, the digital interface 620 outputs the payment completion information, which is received from the POS 630, on the display screen (S636). Then, after verifying the completion of the payment process through the digital interface 620, the user receives the purchased product, which is released from the corresponding storage room 640 (S638).

In the above-described process, each set of information that is outputted on the display screen of the digital interface 620 is not only provided in the form of image data but may also be provided in the form of audio data along with the image data.

Also, as described above, the digital interface 620 may also deliver information on the selected product to the POS 630 even before the user request for the payment process to be carried out.

Additionally, since the digital interface 620 is connected to the user terminal 610 via wired and/or wireless connection, when receiving information on a list of purchased products, which is inputted (or recorded or stored) in advance in the digital interface 620 by the user, the corresponding information on the list of purchased products may be directly downloaded to the user terminal 610 by changing the operation mode of the user terminal or by executing a respective application. Alternatively, when the digital interface 620 is connected to the user terminal 610, items corresponds to a folder, which is configured by default settings, may be outputted, so that the user can select a product by using the user terminal 610 or the digital interface 620.

Furthermore, in the above-described method, only the process of outputting the information on the list of purchased products inputted by the user, the list being downloaded by the digital interface 620 after communicating with the user terminal 610, and verifying the outputted information on the list of purchased products may be performed. And, the process of having the user select a product may be omitted, so that the procedure for purchasing a product can immediately proceed to the payment process.

The description presented above corresponds to a method of carrying out a process of purchasing a product by using a purchase method or to a method of controlling a store.

Hereinafter, referring to FIG. 7, since the process steps S702 to S712 shown in FIG. 7 are identical to process steps S602 to S612 shown in FIG. 6, reference may be made to the description of FIG. 6 for the description of the corresponding process steps. And, therefore, detailed description of the same will be omitted from the description of FIG. 7 for simplicity.

After outputting the product information, which is received from the user terminal 710, the user selects a first product, which the user wishes to purchase via online, from the product information outputted to the digital interface 720 (S714).

Then, the digital interface 720 outputs information on the first product, which is selected by the user, on a display screen (S716). Thereafter, when the user requests for a payment process to be carried out (S718), the information on the first product (wherein the information includes payment information) is delivered to the POS 730 (S720).

The POS 730 delivers the information on the first product, which is received from the digital interface 720, to the storage room 740, so as to send a command requesting the storage room 740 to prepare the release of the first product (S722).

In addition to the information on the selected first product, the digital interface 720 generates information on a second product, which is selected for an offline purchase, and/or outputs the generated information on a display screen (S724).

Herein, for example, the information on the second product, which is generated by the digital interface 720, includes location information indicating the sales location (or displayed location) of the corresponding product and movement course (or path) information indicating the movement course starting from a current location to the display shelf displaying the corresponding selected product.

The user terminal 710 receives the information on the second product, which is generated by the digital interface 720, by downloading the corresponding information from the digital interface 720 (S726).

Based upon the information on the second product, which is downloaded from the digital interface 720 and stored in the user terminal 710, the user may directly purchase each product offline and in person (S728).

Once the user completes the process of purchasing a wanted product via online and offline, the user may request for a payment process to be carried out with respect to the purchased product (S730).

The POS 730 generates payment information in accordance with the request for carrying out the payment process, which is made by the user, and provides the generated payment information (S732). Then, when the user authorizes the payment process to be carried out (S734), the POS 730 communicates with an external payment server so as to carry out the payment process (S736).

Finally, based upon the payment result, when the payment process has been successfully carried out, the POS 730 provides the payment completion information (S738), and the user verifies the completed payment result and receives the product, which he or she has purchased online (S740).

As described in FIG. 6 and FIG. 7, when the user uses a user terminal, the above-described purchase method and, most particularly, the payment process may be carried out, for example, while the user is consistently moving around the store, by using a pre-arranged wireless communication with the digital interface or the POS, without necessarily having to perform operations, such as the payment process, by personally handling (or manipulating) the digital interface or POS, which is located at a pre-determined and fixed location.

Furthermore, among the above-described processes, personal security and convenience may be ensured during the customer authentication process by using, for example, fingerprint information of the corresponding customer each time the payment process is carried out.

Figure 8:
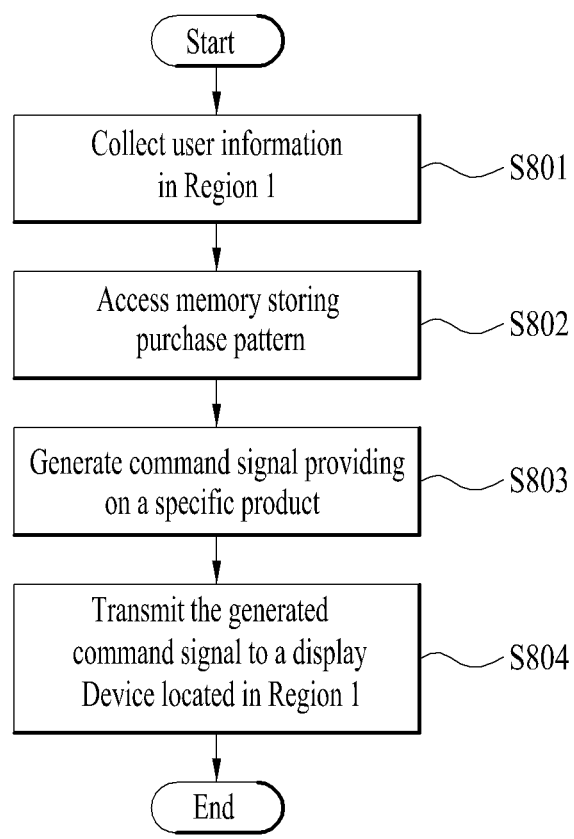
FIG. 8 illustrates a flow chart showing the process steps of a server for controlling a display device according to an exemplary embodiment of the present invention.

FIG. 8 illustrates a flow chart showing the process steps of a server for controlling a display device according to an exemplary embodiment of the present invention.

Hereinafter, a method of having a server according to an exemplary embodiment of the present invention control at least one or more display devices located within a supermarket (or store) will now be described in detail with reference to FIG. 8.

As shown in FIG. 8, the server according to the exemplary embodiment of the present invention receives information on each user using at least one or more mobile devices, each user being located in a first region (or section) within the supermarket (or store) (S802). Herein, two examples may be considered for realizing the above-described step S802. According to a first embodiment of the present invention, a digital card including personal information is mounted (or attached) to a shopping cart. Then, an infrared sensor, an RFID sensor, and so on, which are mounted on the shopping cart, are used so that the shopping cart can perform communication with the display devices within the supermarket or with the server of the supermarket. This process may be more easily understood with reference to FIG. 12. According to a second embodiment of the present invention, it will be assumed that a mobile phone belonging to a user using the shopping cart carries personal information of the corresponding user. Therefore, the mobile phone carrying personal information of the user may communicate with the with the display devices within the supermarket or with the server of the supermarket. This process may be more easily understood with reference to FIG. 12.

Also, the server accesses a memory, which stores information on purchase patterns of single users or group of users (S804). The memory storing information on purchase patterns of single users or group of users will be described in more detail with reference to FIG. 10 or FIG. 11.

Furthermore, based upon the information on the purchase pattern, the server generates a command signal, which provides guidance on a specific product (S806). Thereafter, the server transmits the generated command signal providing guidance on the specific product to a display device, which is located in the first region (S808). The above described steps S806 and S808 will be described in more detail later on with reference to FIG. 9.

Meanwhile, according to another exemplary embodiment of the present invention, step S806 further includes a step of analyzing users, who are located in the first region within the supermarket, and extracting a first group, and a step of generating a command signal providing guidance on a specific product corresponding to the extracted first group. Also, according to yet another exemplary embodiment of the present invention, step S806 further includes a step of analyzing users, who are located in the first region within the supermarket, and extracting a first user having a highest priority level and generating a command signal providing guidance on a specific product corresponding to the extracted first user.

The scope of the present invention also includes designing step S808 so that first graphic data indicating information on a specific location within the supermarket, the specific location having the specific product located therein, and second graphic data indicating a manual for the specific product can both be transmitted.

When the present invention is designed, as shown in FIG. 8, it may be advantageous in that the purchase pattern of a customer visiting the supermarket may be analyzed so that advertisement on the products preferred by the corresponding customer can be quickly provided in accordance with the current location (or position) of the customer. Additionally, when multiple customers are visiting the supermarket (or store), the scope of the present invention also includes assigning a higher priority level to the customer having the highest purchase power in the corresponding supermarket, or grouping a set of customers so that an advertisement of a product most adequate for the corresponding group can be displayed and provided to the specific group of customers.

Figure 9:
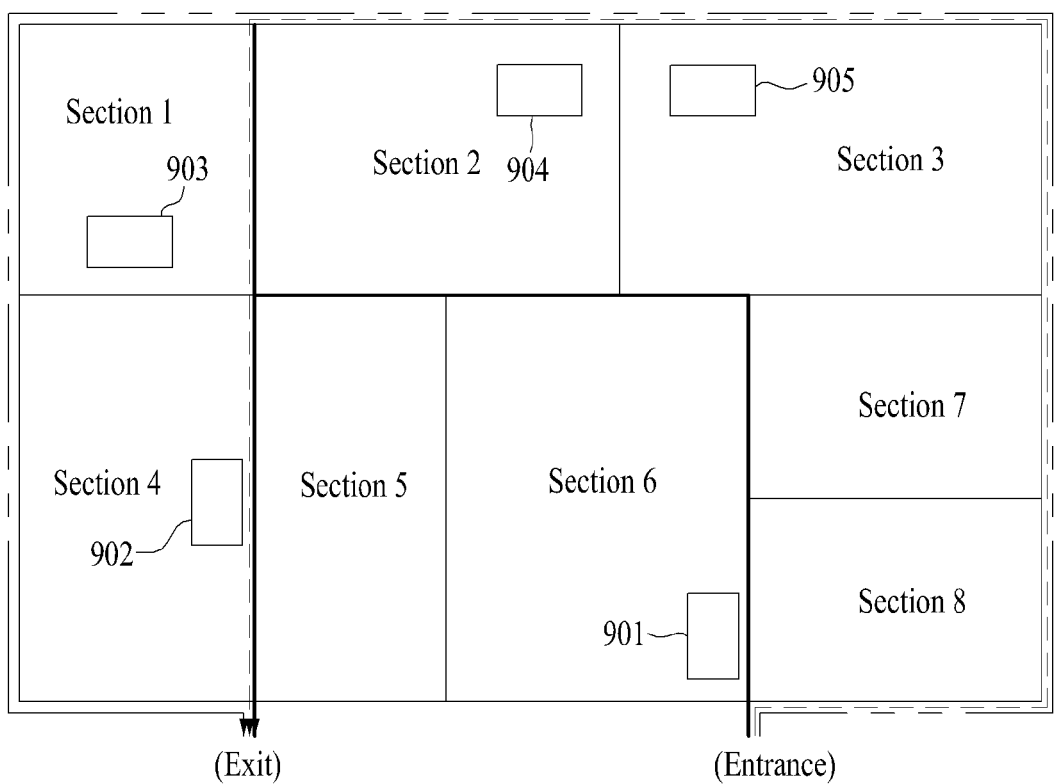
FIG. 9 illustrates data provided by the display device in accordance with a movement course of a customer according to the present invention.

FIG. 9 illustrates data provided by the display device in accordance with a movement course of a customer according to the present invention.

Hereinafter, a user interface being displayed on a display device in accordance with the movement course (or path) of a specific customer will be described in detail with reference to FIG. 9.

As described above, according to the exemplary embodiment of the present invention, the location of a customer within the supermarket may be traced (or detected) by using a shopping cart or a mobile phone. Also, the information on the traced location of the customer may be directly transmitted to the server or may be transmitted to the server after passing through display devices 901, 902, 903, 904, and 905. Also, for example, it will be assumed that the server is provided with a database, as shown in FIG. 10.

As shown in FIG. 9, it is assumed that Customer A has moved to a different location within the supermarket. Also, the server according to the exemplary embodiment of the present invention carries location information on Customer A. Therefore, the server may transmit optimized advertisement data designated to Customer A to a display device 901 that is located in Section 6 (or Region 6), where only Customer A is located. The advertisement data specifically optimized for Customer A may, for example, correspond to advertisement related to a specific product, which Customer A has most frequently purchased, or may correspond to advertisement related to a specific product, on which Customer A has spend the most amount of money.

Meanwhile, as shown in FIG. 9, it is assumed that Customer C has moved to a different location within the supermarket. Also, the server according to the exemplary embodiment of the present invention carries location information on Customer C. Accordingly, the server may transmit advertisement data specifically optimized for Customer C to a display device 903 located with the closest range of the movement course (or path) of Customer C.

Conversely, the display device 904 located in Section 2 (or Region 2) within the supermarket and the display device 905 located in Section 3 (or Region 3) within the supermarket both correspond to the movement paths of Customer B and Customer C. Also, the display device 902 located in Section 4 (or Region 4) within the supermarket corresponds to the movement paths of Customer A and Customer B. AS described above, when two or more customers are concurrently located in a same random section (or region), the server may compare the purchase power of each customer, so as to assign a higher priority level to the customer having the higher purchase power with the corresponding supermarket. Therefore, the server transmits the advertisement data most adequate for the customer, who has the highest purchase power in the corresponding supermarket, to the display device located in the corresponding section (or region).

According to yet another exemplary embodiment of the present invention, based upon common information (e.g., age, gender, and so on) of customers, who are concurrently located in the same section (or region) within the supermarket, the server may also transmit advertisement data which may commonly interest a plurality of customers simultaneously located in the same section, to the display device located (or installed) in the corresponding section (or region).

FIG. 10 illustrates a database storing information related to customer-basis purchase patterns according to an exemplary embodiment of the present invention.

Hereinafter, according to an exemplary embodiment of the present invention, a database storing information related to the purchase pattern of each customer will be described in detail with reference to FIG. 10.

In order to implement FIG. 8 and FIG. 9, the server is designed to be capable of accessing the database shown in FIG. 10. Evidently, the scope of the present invention includes having the server include the database, shown in FIG. 10, as its component.

As shown in FIG. 10, information on the products that have been purchased in the past by each customer visiting the supermarket is stored in the database. More specifically, the scope of the present invention also includes designing a first address of the memory so that information on the type of products purchased by each user (or customer) in the past and information on the cost (or price) respective to the purchased products can be stored therein.

For example, since Customer A has spent the largest sum of money for purchasing products in the corresponding supermarket up to the present time, Customer A is mapped to a Rank 1 priority level for showing the highest customer purchase power. And, information on the most frequently purchased Product and information on the second most frequently purchased Product b are also mapped and stored in the memory.

Meanwhile, since Customer B has spent the second largest sum of money for purchasing products in the corresponding supermarket up to the present time, Customer B is mapped to a Rank 2 priority level for showing the second highest customer purchase power. And, information on the most frequently purchased Product c and information on the second most frequently purchased Product d are also mapped and stored in the memory.

Furthermore, since Customer C has spent the third largest sum of money for purchasing products in the corresponding supermarket up to the present time, Customer C is mapped to a Rank 3 priority level for showing the third highest customer purchase power. And, information on the most frequently purchased Product e and information on the second most frequently purchased Product f are also mapped and stored in the memory.

Accordingly, as shown in FIG. 9, when a plurality of customers is simultaneously located in the same section, the server refers to the database shown in FIG. 10 so that advertisement data being focused on the customer, who has the relatively higher purchase power, can be outputted through the display device.

FIG. 11 illustrates a database storing information related to group-basis purchase patterns according to an exemplary embodiment of the present invention.

Hereinafter, according to an exemplary embodiment of the present invention, a database storing information related to the purchase pattern of each group of customers will be described in detail with reference to FIG. 11.

In order to implement FIG. 8 and FIG. 9, the server is designed to be capable of accessing the database shown in FIG. 11. Evidently, the scope of the present invention includes having the server include the database, shown in FIG. 11, as its component.

As shown in FIG. 11, information on the products that have been purchased in the past by each group of customers visiting the supermarket is stored in the database. More specifically, the scope of the present invention also includes designing a second address of the memory so that information on the type of products purchased by users (or customers) belonging to a specific group in the past and information on the cost (or price) respective to the purchased products can be stored therein.

For example, since Group X has spent the largest sum of money for purchasing products in the corresponding supermarket up to the present time, Group X is mapped to a Rank 1 priority level for showing the highest customer-group purchase power. And, information on the most frequently purchased Product m and information on the second most frequently purchased Product n are also mapped and stored in the memory.

Meanwhile, since Group Y has spent the second largest sum of money for purchasing products in the corresponding supermarket up to the present time, Group Y is mapped to a Rank 2 priority level for showing the second highest customer-group purchase power. And, information on the most frequently purchased Product o and information on the second most frequently purchased Product p are also mapped and stored in the memory.

Furthermore, since Group Z has spent the third largest sum of money for purchasing products in the corresponding supermarket up to the present time, Group Z is mapped to a Rank 3 priority level for showing the third highest customer-group purchase power. And, information on the most frequently purchased Product q and information on the second most frequently purchased Product r are also mapped and stored in the memory.

Figure 12:
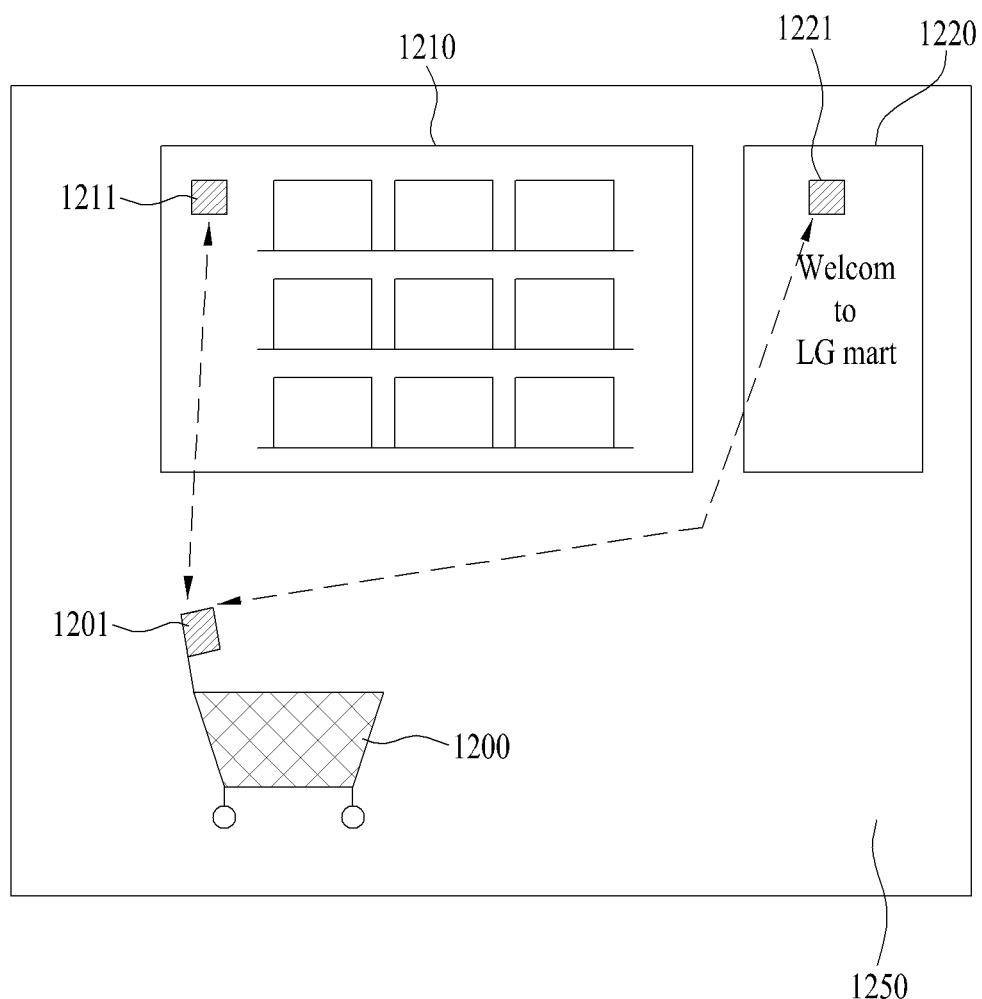
FIG. 12 illustrates a process of detecting a user (or customer) located within the store (or supermarket) according to an exemplary embodiment of the present invention.

FIG. 12 illustrates a process of detecting a user (or customer) located within the store (or supermarket) according to an exemplary embodiment of the present invention. Hereinafter, according to the exemplary embodiment of the present invention, a process for detecting a user located within the store will be described in detail with reference to FIG. 12.

As shown in FIG. 12, at least one or more display shelves 1210 and at least one or more display devices 1220 may be designed to be located within a first zone (or Zone 1) 1250 within the supermarket. Also, unlike the related art supermarket environment, the display shelf 1210 is provided with a detector 1211, which is configured to sense (or detect) infrared signals. Similarly, the display device 1220 is also provided with a detector 1221, which is configured to sense (or detect) infrared signals.

Accordingly, the above-described detectors 1211 and 1221 may sense (or detect) an infrared module 1201, which is attached to a shopping cart 1200 that is designed to move around the supermarket. When the supermarket environment is designed as described above, the control system of the corresponding supermarket may be capable of estimating the number of customers positioned (or located) in Zone 1 1250.

Figure 13:
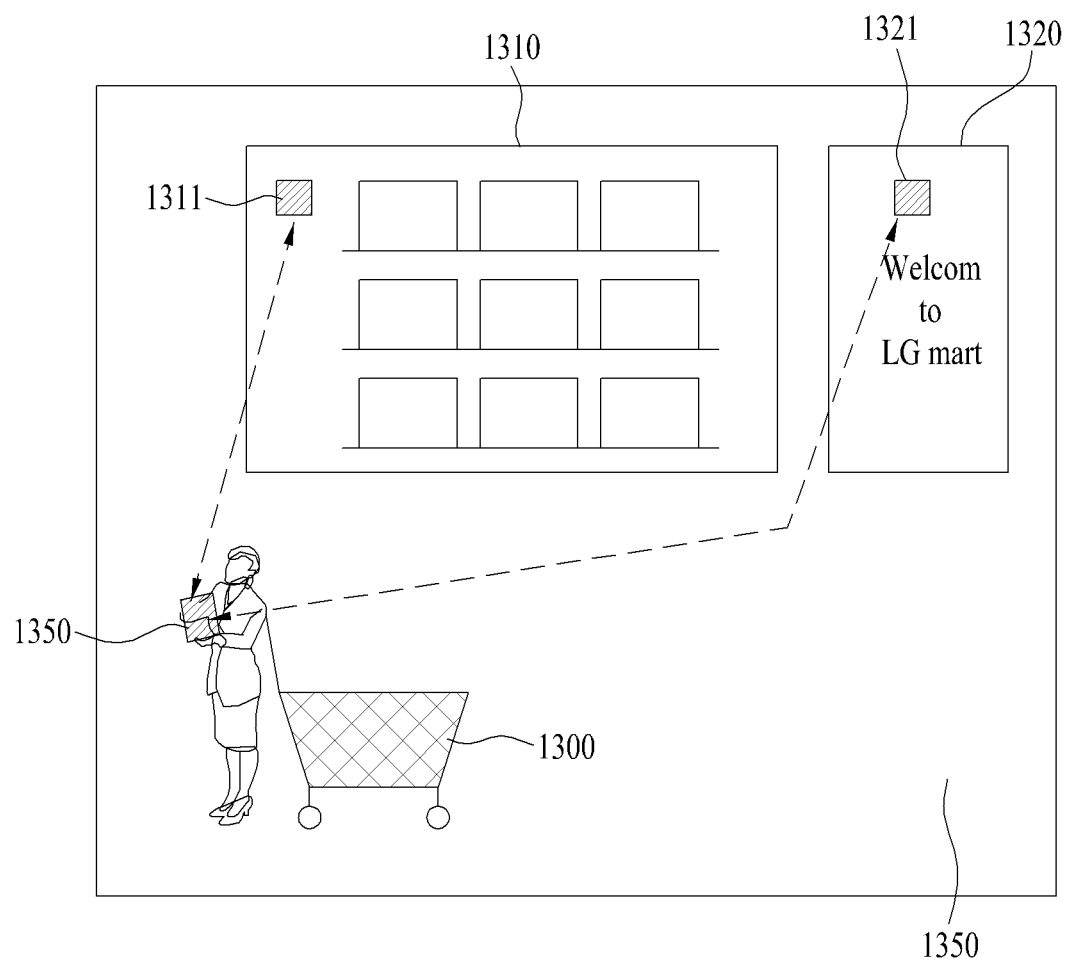
FIG. 13 illustrates a process of detecting a user (or customer) located within the store (or supermarket) according to another exemplary embodiment of the present invention.

FIG. 13 illustrates a process of detecting a user (or customer) located within the store (or supermarket) according to another exemplary embodiment of the present invention.

Hereinafter, according to the other exemplary embodiment of the present invention, a process for detecting a user located within the store will be described in detail with reference to FIG. 13.

As shown in FIG. 13, at least one or more display shelves 1310 and at least one or more display devices 1320 may be designed to be located within a first zone (or Zone 1) 1350 within the supermarket. Also, unlike the related art supermarket environment, the display shelf 1310 is provided with a network sensor 1311, which is configured to communicate with mobile devices. Similarly, the display device 1320 is also provided with a network sensor 1321, which is configured to communicate with mobile devices. The above-described network sensors may be designed by using, for example, Wi-Fi or Bluetooth access points (APs).

Accordingly, the above-described network sensors 1311 and 1321 may perform data communication with a mobile device 1301, which is carried by the customer using the shopping cart 1300 that can move around the supermarket. F or example, the network sensors 1311 and 1321 may be designed to collect personal information stored in the mobile device 1301 and transmit the collected personal information to the server.

FIG. 14 illustrates a method of a display device for recognizing a specific customer. Hereinafter, the method of the display device for recognizing a specific customer will be described in detail with reference to FIG. 14.

A sensor, which can recognize a distance between the sensor and a customer (or user) is added to a display device (or digital signage display). And, when the customer approaches the corresponding digital device, the display mode may change its operation mode from Mode 1 to Mode 2.

First of all, as shown in FIG. 14(a), a display device 1420 according to the exemplary embodiment of the present invention is located next to the display shelf 1410. Evidently, the scope of the present invention is not limited to have the display device 1420 located only next to the display shelf 1410.

Also, being provided with an infrared sensor, the display device 1420 may determine whether or not a random customer (or user) has approached the display device 1420 within a specific distance (D) range. Accordingly, as shown in FIG. 14(a), when a customer 1400 located in the supermarket moves to another location beyond the predetermined distance (D) range, the display device 1420 displays a general advertisement screen.

Meanwhile, as shown in FIG. 14(b), when the customer (or user) 1401 located in the supermarket approaches the display device 1421 within a specific distance (D) range, the display device 1421 changes its operation mode to a mode responding to the corresponding customer (i.e., customer assistance mode). This will be described later on in more detail with reference to FIG. 15 and FIG. 16.

Figure 15A:
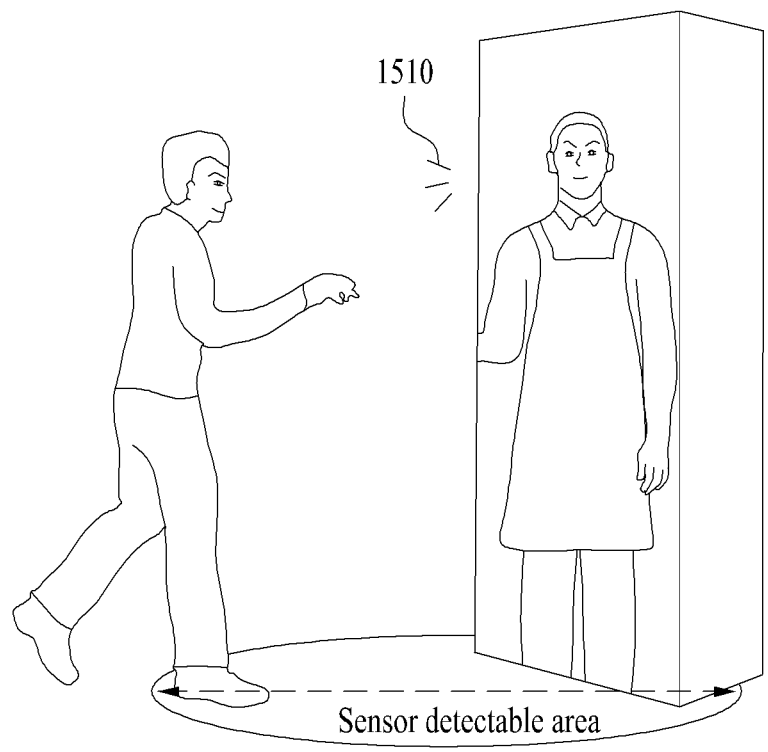
FIG. 15a to FIG. 15c illustrate a process of the display device according to the exemplary embodiment of the present invention for transmitting and receiving audio (or voice) information to and from a specific customer.
Figure 15B:
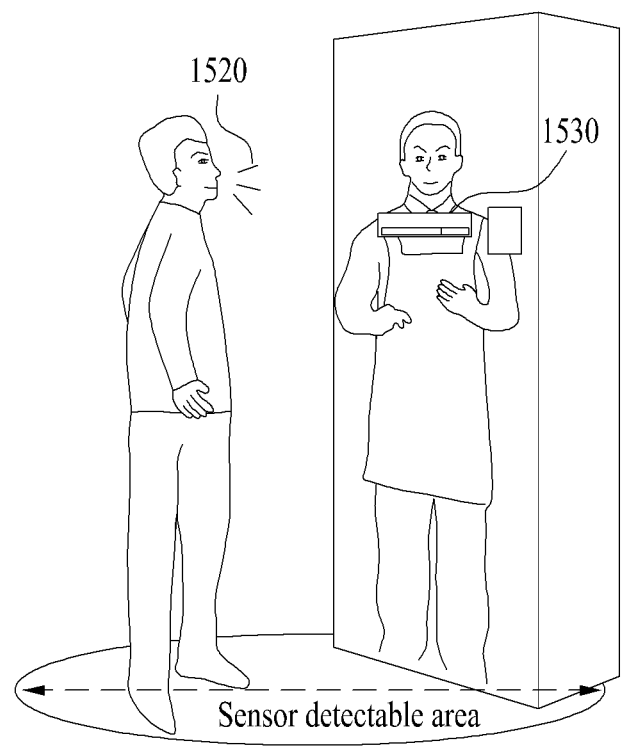
Figure 15C:
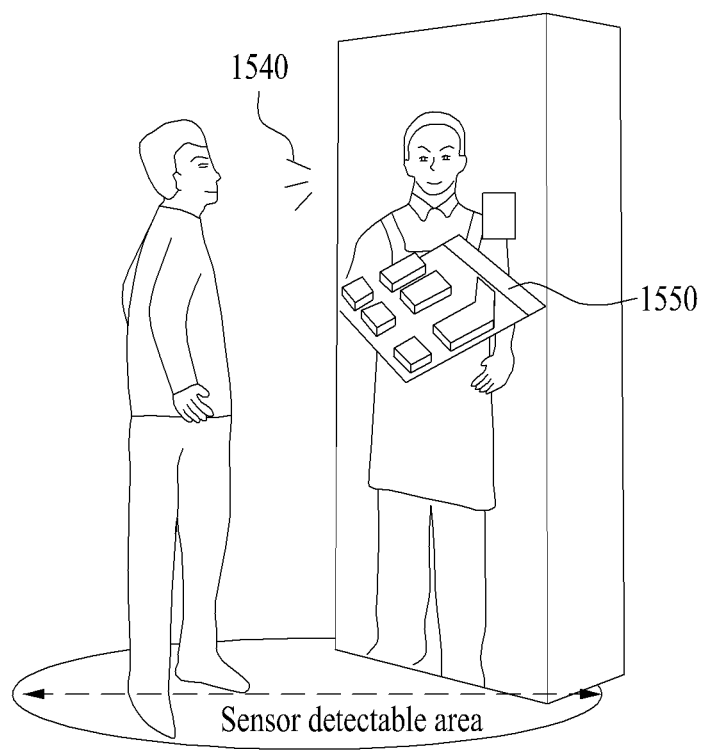

FIG. 15a to FIG. 15c illustrate a process of the display device according to the exemplary embodiment of the present invention for transmitting and receiving audio (or voice) information to and from a specific customer.

Hereinafter, the process steps performed by the display device according to the exemplary embodiment of the present invention for transmitting and receiving audio (or voice) information to and from a specific customer will now be described in detail.

First of all, as shown in FIG. 15a, it is assumed that a customer is located within an area (or region) where a display device can detect the presence of an object or a person. At this point, the display device automatically changes its display screen and operation mode to a customer assistance mode and simultaneously outputs voice data 1510 saying "May I help you?"

Furthermore, as shown in FIG. 15b, the customer replies to the question made by the display device with a keyword 1520 related to a specific product, which the customer wishes to purchase. At this point, it is advantageous in that, by being designed to output 1530 the recognized keyword, the display device may be capable of providing the customer with feedback indicating whether or not the display device has successfully received and recognized the keyword intended by the customer.

Finally, as shown in FIG. 15c, the display device displays map information 1550 indicating a specific location in which the corresponding product is located, and, at the same time, the display device outputs the related information via voice data 1540.

Accordingly, when the display device is designed as shown in FIG. 15a to FIG. 15c, although a supermarket employee is not actually present in the corresponding area, the customer may believe to have performed an actual conversation with a virtual (or non-real) person best-fitting the corresponding situation.

FIG. 16a to FIG. 16f illustrate a process of the display device according to the exemplary embodiment of the present invention for changing graphic display in accordance with a time flow.

Hereinafter, the process steps performed by the display device according to the exemplary embodiment of the present invention for changing graphic display in accordance with a time flow will be described in detail with reference to FIG. 16a to FIG. 16f.

Figure 16A:
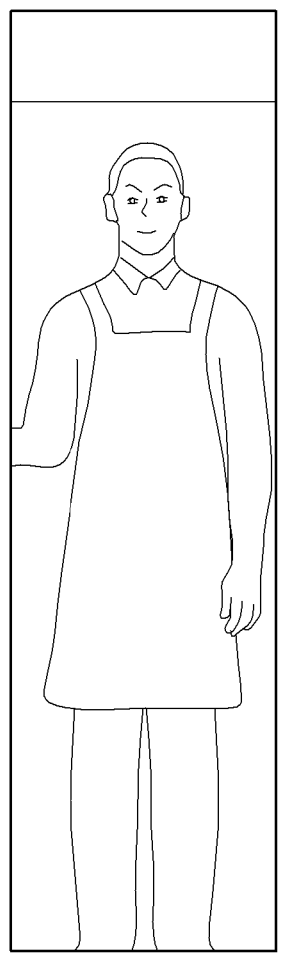
FIG. 16a to FIG. 16f illustrate a process of the display device according to the exemplary embodiment of the present invention for changing graphic display in accordance with a time flow.

As described above, when a random customer is sensed (or detected) by a sensor, user interfaces shown in FIG. 16a are sequentially displayed. Evidently, the scope of the present invention includes implementing another exemplary embodiment of the present invention by adequately deleting and combining graphic data shown in FIG. 16.

Figure 16B:
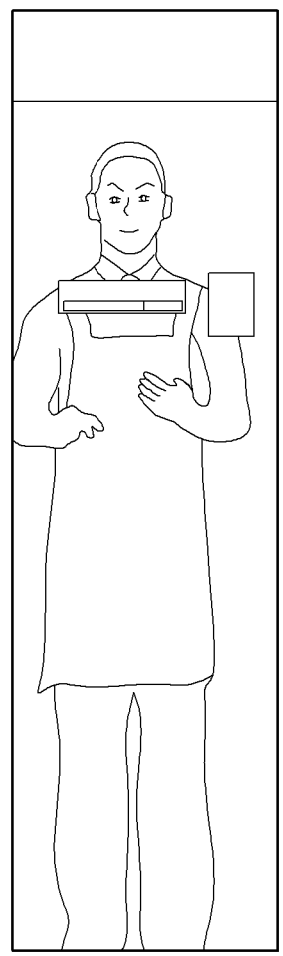

First of all, when a random customer is sensed (or detected) the display device according to the exemplary embodiment of the present invention outputs graphic data welcoming the corresponding customer, as shown in FIG. 16a. Also, when the display device receives an input signal corresponding to a keyword from the customer, graphic data notifying the customer that a search process is being performed by using the recognized keyword is outputted, as shown in FIG. 16b.

Figure 16C:
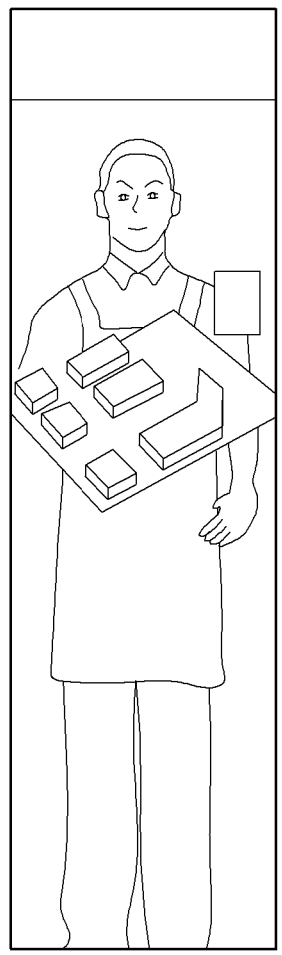

Additionally, as shown in FIG. 16c, the display device outputs graphic data notifying the customer of the specific location in which the searched product is located within the supermarket. For example, such graphic data may correspond to a user interface configured of a map format.

Figure 16D:
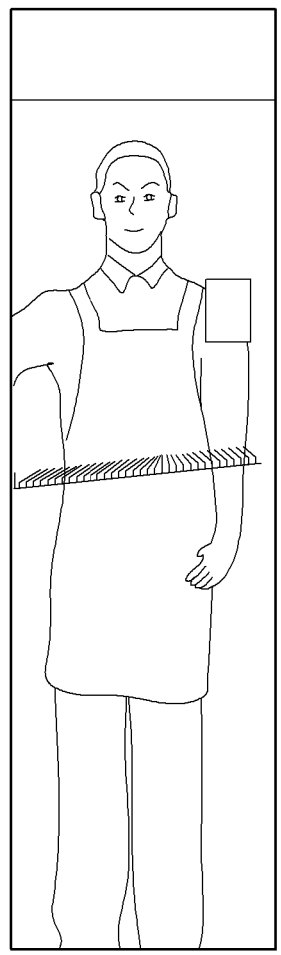
Figure 16E:
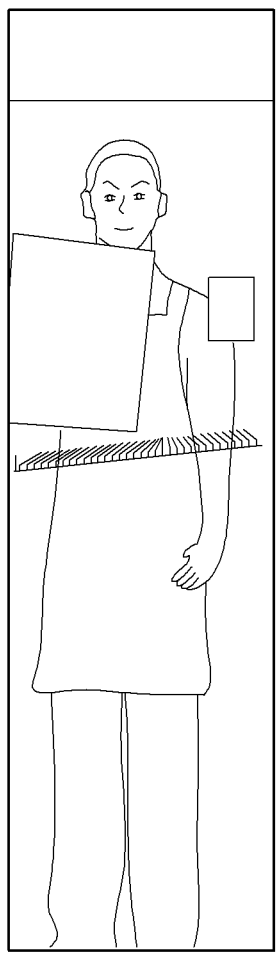

Furthermore, as shown in FIG. 16d, graphic data searching for a recipe according to which the user may cook or process the corresponding product may be displayed either automatically or in accordance with a user input. And, as shown in FIG. 16e, graphic data recommending a specific recipe may be outputted.

Figure 16F:
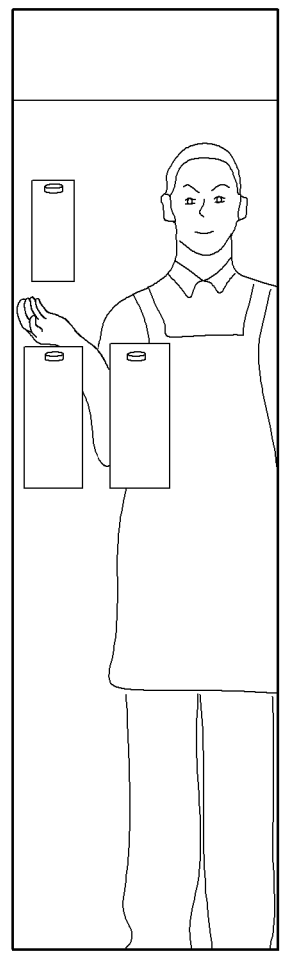

Finally, as shown in FIG. 16f, among the many products, the display device may output graphic data recommending a specific product, which is produced by a specific manufacturing company. For example, the scope of the present invention may include designing the display device, so that the display device can automatically recommend a specific product that has currently been showing the highest sales rate.

Hereinafter, a method for recognizing a product and/or for providing product information and promotion information from a digital interface according to the present invention will now be described in more detail.

Figure 17:
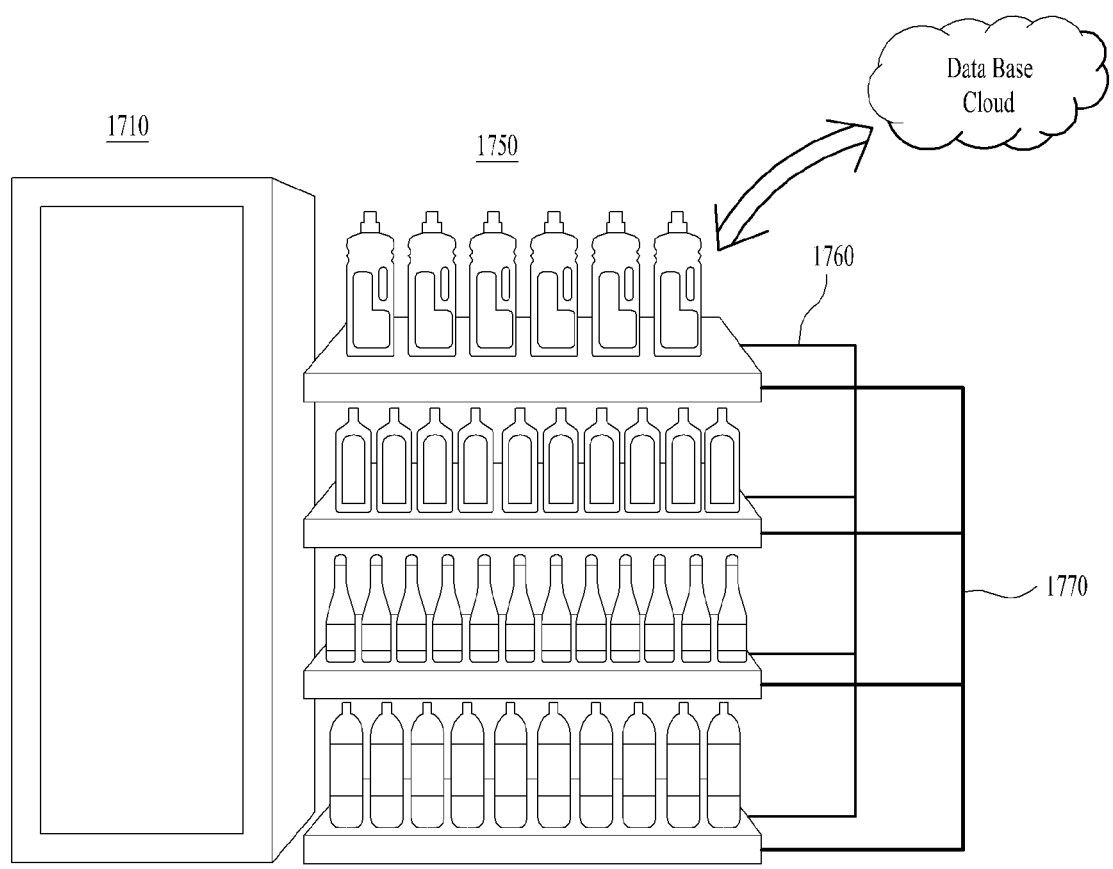
FIG. 17 illustrates an exemplary method for recognizing a product and providing respective information from a digital interface according to the present invention.

FIG. 17 illustrates an exemplary method for recognizing a product and providing respective information from a digital interface according to the present invention.

Herein, the digital interface according to an exemplary embodiment of the present invention includes a digital signage display 1710 and a smart-shelf 1750. And, hereinafter, each component and data exchange between each component and the related operations will also be described in detail.

Herein, one digital signage display 1710 may be connected to at least one or more smart-shelves 1750 via wired and/or wireless connection. Conversely, one smart-shelf 1750 may be connected to at least one or more digital signage displays 1710 via wired and/or wireless connection.

Also, the digital signage display 1710 and/or smart-shelf 1750 may be connected to a POS, server, database cloud 1790, and so on via wired and/or wireless connection.

Herein, Wi-Fi or Bluetooth may be used as the above-described wireless communication method.

Accordingly, a method of managing a store that can recognize a specific product and output information on the recognized product through a digital interface, which is included in the system for controlling the store according to the present invention, may include the steps of recognizing a product assigned to the digital interface, receiving data related to the recognized product, decoding the received data related to the recognized product, and outputting the decoded data related to the recognized product to a predetermined area (or region) respective to the corresponding product. Herein, the data related to the recognized product may include at least one of audio data, video data, and text data configured for the advertisement and promotion of the corresponding product. And, the data related to the recognized product may be extracted from a database of the system for controlling the store.

The above-described digital interface may include a product recognition unit configured to recognize a product positioned (or located) on a shelf, and at least any one of a digital display shelf provided with an output unit configured to output information on the recognized product and a digital signage display configured to output data related to the product recognized from the digital display shelf. And, the digital interface may also be provided with a communication module so as to support wireless and/or wired communication and to transmit and/or receive data.

Additionally, in the above described method, the step of recognizing a specific product may use any one of a method for recognizing the corresponding product including the steps of sensing a weight of a predetermined area of the digital display shelf, and receiving product data respective to the sensed weight, a method for recognizing the corresponding product including the steps of acquiring an image of a product located in a predetermined area of the digital display shelf, and receiving product data respective to the acquired image, and a method for recognizing the corresponding product including the steps of sensing a weight of a predetermined area of the digital display shelf, acquiring an image of a product located in the predetermined area of the digital display shelf, and receiving product data respective to the sensed weight and the acquired image.

Moreover, the data related to the recognized product further includes electronic-price tag (or E-price tag) data of the corresponding product. And, herein, the E-price tag data of the corresponding product may be received and outputted to a predetermined section respective to the corresponding product in a text data format. Alternatively, the data related to the recognized product further includes E-price tag data of the corresponding product. And, herein, the E-price tag data of the corresponding product may be outputted from a digital display shelf included in the digital interface as data related to the recognized product, and advertisement and promotion data respective to the recognized product may be outputted from a digital signage display included in the digital interface. Furthermore, the data related to the recognized product further includes E-price tag data of the corresponding product. And, herein, the digital signage display included in the digital interface may be divided into a plurality of predetermined sections, in row or column units, based upon a method of positioning products on the digital display shelf, and the digital signage display may output data respective to at least one of the products displayed on a digital display shelf corresponding to each of the plurality of predetermined divided sections.

Additionally, the method for managing a store may further include the steps of interfacing with a user terminal of a user recognized within a predetermined range, receiving at least one of customer information and purchase list information from the interface user terminal of the recognized user, receiving data respective to a product being recognized by a digital display shelf, based upon the received at least one of customer information and purchase list information, or receiving data respective to a related product from a database, decoding the corresponding product data, and outputting the decoded product data.

For example, the digital signage display 1710 may broadly perform two functions. One of the two functions corresponds to the function, which is described above with reference to FIG. 4 to FIG. 7. And, the other function corresponds to the function of being operated in connection with the smart-shelf 1750, outputting information, such as information on products displayed on the digital shelf 1750, advertisement and/or promotion information, and so on, or independently outputting basic information related to the corresponding store (or supermarket), emergency information, or independent product information, product information based upon information on a user that is recognized by the user himself (or herself) or a user terminal.

Meanwhile, the digital signage display 1710 may provide advertisement or promotion information not only on a product displayed on a neighboring smart-shelf but also on other products displayed on other smart-shelves through a display screen 1720. In this case, although the digital signage display 1710 is not directly connected to other digital shelves via wired and/or wireless communication, the digital signage display 1710 may be provided with the respective information through a communication medium, such as the POS.

The smart-shelf 1750 is configured of at least one or more floors displaying products 1760. Herein, a floor will hereinafter be referred to as a shelf 1770 for simplicity. Accordingly, a smart-shelf 1750 is configured of at least one or more shelves 1770.

In FIG. 17, it is illustrated that only one type of products is displayed on each shelf 1770. And, in the example shown in FIG. 17, it will be assumed that one smart-shelf 1750 is provided with 4 shelves 1770.

However, the present invention will not be limited only to the example given herein. In other words, several different types of products may be displayed on one shelf 1770. And, therefore, it will be apparent that one or more smart-shelves may be configured of only one shelf or more than one shelves depending upon the characteristics of the displayed products.

Each shelf 1770 included in the smart-shelf according to the present invention may be provided with one or more detection devices 1780 so as to recognize a displayed product. Herein, the detection device 1780 may, for example, include a detection sensor, a weight sensor, a code recognition sensor, a camera sensor, and so on.

Also, each shelf 1770 includes an electronic-price tag (or E-price tag) unit 1790 being configured to provide information, such as name, price, size, expiration date, manufacturer, date of storage, and so on, of the displayed product.

Herein, the above-described E-price tag unit 1790 may be provided in a predetermined area located along a direction that can be recognized by the customer. More specifically, unlike the above-described detection device 1780, the E-price tag unit 1790 is configured to provide information to the customers. Accordingly, the E-price tag unit 1790 may provide the corresponding information on its front surface, side surface, and so on, which correspond to a location that can be recognized by the customer.

Additionally, when only one type of products is displayed on a single shelf, only one set of information may be provided to the corresponding shelf. In other words, depending upon the type of products being displayed on a shelf, the E-price tag unit 1790 may provide tag information for each area, in which each product is displayed, within a single shelf.

Also, regardless of the product type, tag information may be provided for each product being displayed regardless of the product type.

By providing the above-described tag information, instead of limiting the output format of the E-price tag unit 1790 only to a fixed format, for example, when the user comes within a close range, the tag information may be outputted in a blinking format. Alternatively, when the size of the tag information is large, the tag information may be provided in a format similar to that of subtitles messages that are displayed during data broadcasting, wherein the tag information is provided along a horizontal direction from left to right, or along a vertical direction from top to bottom, or vice versa.

Additionally, the detection device 1780 and the E-price tag unit 1790, which are included in the shelf 1770, may be operated in connection with one another. More specifically, when at least one product is displayed on the shelf 1770, the detection device 1780 detects the displayed product and then transmits or uploads information on the detected product to the database cloud 1800. And, the E-price tag unit 1790 receives or downloads information on the detected product from the database cloud 1800, thereby outputting the received or downloaded information.

Herein, according to the present invention, the database cloud 1800 may, for example, refer to a cloud server separately established by the store (or supermarket). However, such database cloud 1800 is merely exemplary, and, therefore, the present invention will not be limited only to the example given herein. Accordingly, the present invention may also use a POS or separate server performing the same functions as the above-described the database cloud 1800.

The method for recognizing a product according to the present invention broadly includes a method of using a sensor and a method of using a code reader. Herein, for example, in the method of using a sensor, any one of a close-range sensor, an infrared sensor, a heat-detection sensor, a motion recognition sensor, an RFID sensor, an NFC sensor, and so on, may be used as the sensor. Also, for example, in the method of using a code reader, a barcode reader configured to recognize each of a barcode, QR code, and Near Field Communication (NFC) tag, a QR code scanner, and an NFC tag scanner may be used as the code reader.

Additionally, for example, the above-described infrared sensor may include an active infrared sensor and a passive infrared sensor. Herein, the active infrared sensors may two or more sensors. And, infrared light rays are emitted from one side (i.e., light-emitting unit), and the emitted infrared light rays are received by the other side (i.e., light-receiving unit). Thus, by detecting the infrared light rays emitted from the light-emitting portion, it may be determined whether or not an object exists between the light-emitting unit and the light-receiving unit. In the passive infrared sensor, a separate light-emitting unit is not required, and only a light-receiving unit is included in the passive sensor. In other words, the passive infrared sensor uses a simple method of having the light-receiving unit detect external heat and notify the detected external heat. As described above, for example, one sensor may exist for each row of the smart-shelf. And, a light-emitting unit and a light-receiving unit may be respectively provided on a lower portion and an upper portion of the area of the smart-shelf, in which each product is placed and displayed. Alternatively, a light-receiving unit may be provided on one side surface, and a light-emitting unit may be provided on another side surface. In this case, the light-emitting unit of the infrared sensor may periodically and/or aperiodically project infrared light rays, and, when the light-receiving unit is incapable of receiving the projected infrared light rays, the passive infrared sensor may determine and recognize that a product is placed on the smart-shelf, thereby sensing the product.

In the above-described structure, the code reader recognizes code information attached to a random product.

The product recognition according to the present invention will hereinafter be described in more detail. For example, it will be assumed that only one weight sensor or detection sensor is provided in each shelf 1770 of the smart-shelf 1750.

For example, each shelf 1770 divides and determines, in advance, areas of the corresponding shelf 1770 in which products are to be displayed. Then, once each shelf 1770 downloads in advance information on a size of the corresponding product, in case a product is placed in the corresponding area, only the weight may be detected so as to recognize the corresponding product. In this case, based upon the total number of products that are to be displayed on the shelf 1770, the shelf 1770 may determine the number of products placed up to the current time. Accordingly, for example, the shelf 1770 may be designed to have holes or molded cavities fitting to the re-arranged products that are expected to be displayed on the shelf 1770. Thus, along with the function of recognizing the displayed products, the shelf 1770 may also be capable of preventing any product loss or critical accidents from occurring.

Additionally, the products may be recognized by having the lower portion of each area of the shelf be provided with a weight sensor. In other words, by being provided with only one detection sensor, the shelf 1770 may be capable of recognizing all products displayed on the corresponding shelf. However, the shelf 1770 may also be provided with a plurality of detection sensors respective to each product displayed on the corresponding shelf.

In another method, the smart-shelf 1750 may be provided with a code recognition sensor in a predetermined section of each shelf or smart-shelf. Thereafter, the products may be recognized by having the smart-shelf recognize the code corresponding to each product. In this case, the display position of each product may also be recognized in accordance with each shelf.

Also, by attaching a camera on the front surface area or an upper portion of the smart-shelf 1750, image data of each product may be generated, and the generated image data may be transmitted to the database cloud 1800 or the server, so that the products displayed on each shelf can be recognized.

Alternatively, by providing each shelf with a rail enabling vertical and/or horizontal movement to be made within a predetermined space, and by providing the rail with an infrared sensor, a camera, a code recognition sensor, and so on, all of the display products may be recognized despite the positions of each code recognition tag respective to the size of the corresponding product.

Furthermore, according to the present invention, by combining the above-described sensors or methods, all products displayed on the smart-shelf 1750 may be recognized. In other words, the above-described sensors or methods are merely examples given to facilitate the understanding of the present invention. Therefore, any device that can be used as a sensor or device for recognizing products and for recognizing display positions may be used herein.

According to the present invention, when each product displayed in the smart-shelf 1750 is recognized, the information on the recognized product is uploaded to the database cloud 1800.

As described above, such uploaded product information may be downloaded from the E-price tag unit 1790, so as to be outputted to each shelf 1770 in which the corresponding product is displayed.

Hereinafter, a connection relation between a smart-shelf 1750 and a digital signage display 1710 in the system for controlling the store according to the present invention will be described in detail. Herein, the digital signage display 1710 and the smart-shelf 1750 may be connected to one another via wireless and/or wired communication and may use the above-described database cloud 1800. Alternatively, the digital signage display 1710 and the smart-shelf 1750 may exchange data to and from one another through a POS or a server.

For example, the database cloud 1800 may be separately managed by the store. And, by creating and updating the database related to all products displayed in the corresponding store (or supermarket), all systems within the store may be digitalized.

According to the present invention, when the smart-shelf 1750 uses the above-described method so as to recognize the products displayed on each shelf, information on the location, type, and so on, of the recognized products is uploaded to the database cloud 1800. Herein, by using the identification information of the smart-shelf from the database cloud 1800, the digital signage display 1710 downloads the data uploaded by the corresponding smart-shelf. Alternatively, the digital signage display 1710 may also receive data from the smart-shelf 1750 by directly communicating with the smart-shelf 1750 via Wi-Fi or Bluetooth.

The digital signage display 1710 may directly or indirectly receive data from a smart-shelf, which operates in connection with the digital signage display 1710.

Herein, the digital signage display 1710 may download, separately and in advance, identification information for recognition and connected operation of each smart-shelf within the store, location information, image data of each product, price information of each product, advertisement and promotion data from the database cloud 1800, the POS, the server, and so on, and, then, store the downloaded data and information in the memory. The digital signage display 1710 may periodically or aperiodically communicate with the corresponding server so as to determine whether or not the data stored in the memory are updated. Then, based upon the determined result, when data update is required, the corresponding data may be updated in real-time or non-real time and then newly stored.

As described above, in addition to the information on each product, the above-described digital signage display 1710 may also provide information on the store (or supermarket). Herein, for example, the information on the store (or supermarket) may include store advertisement information, information on any special sales event within the store, urgent message notification, and so on.

Figure 18:
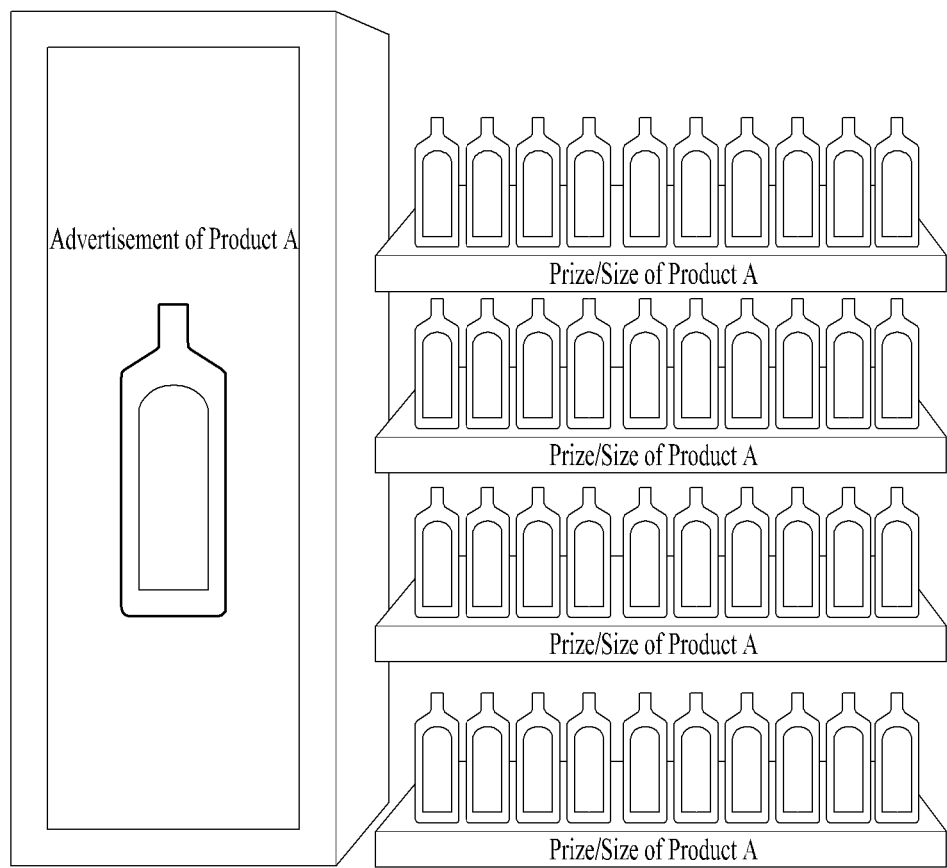
FIG. 18 and FIG. 19 illustrate exemplary operations respective to a connection between a digital signage display and a smart-shelf according to an exemplary embodiment of the present invention.
Figure 19:
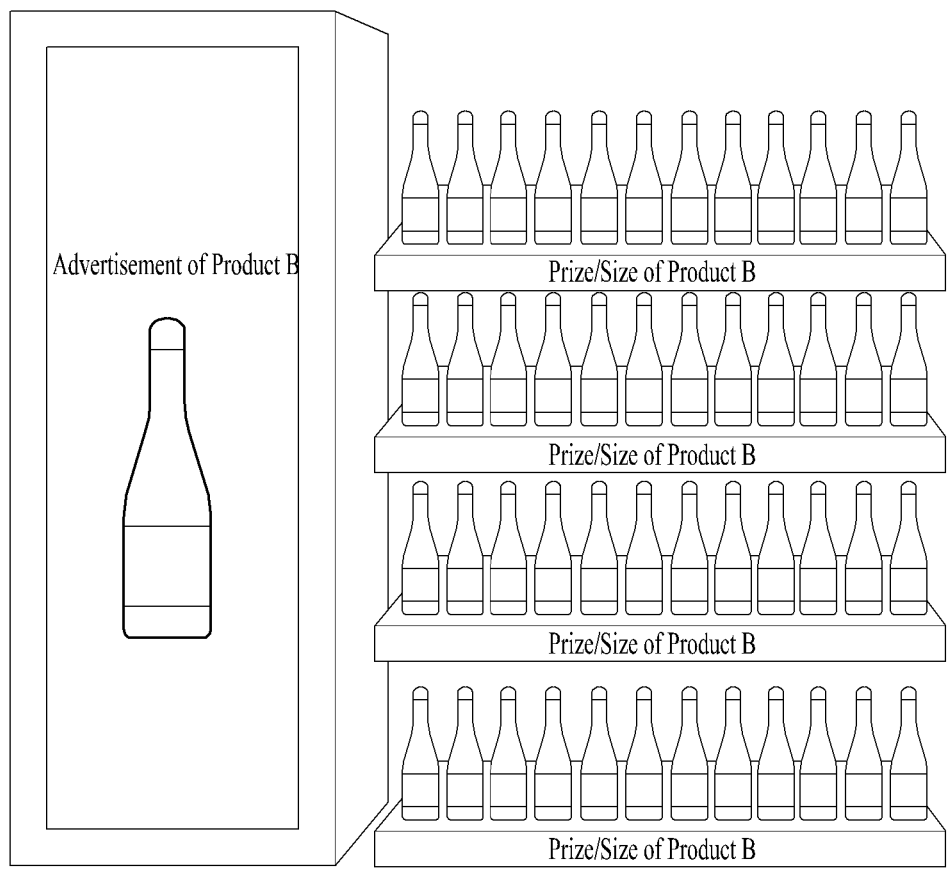
Figure 20:
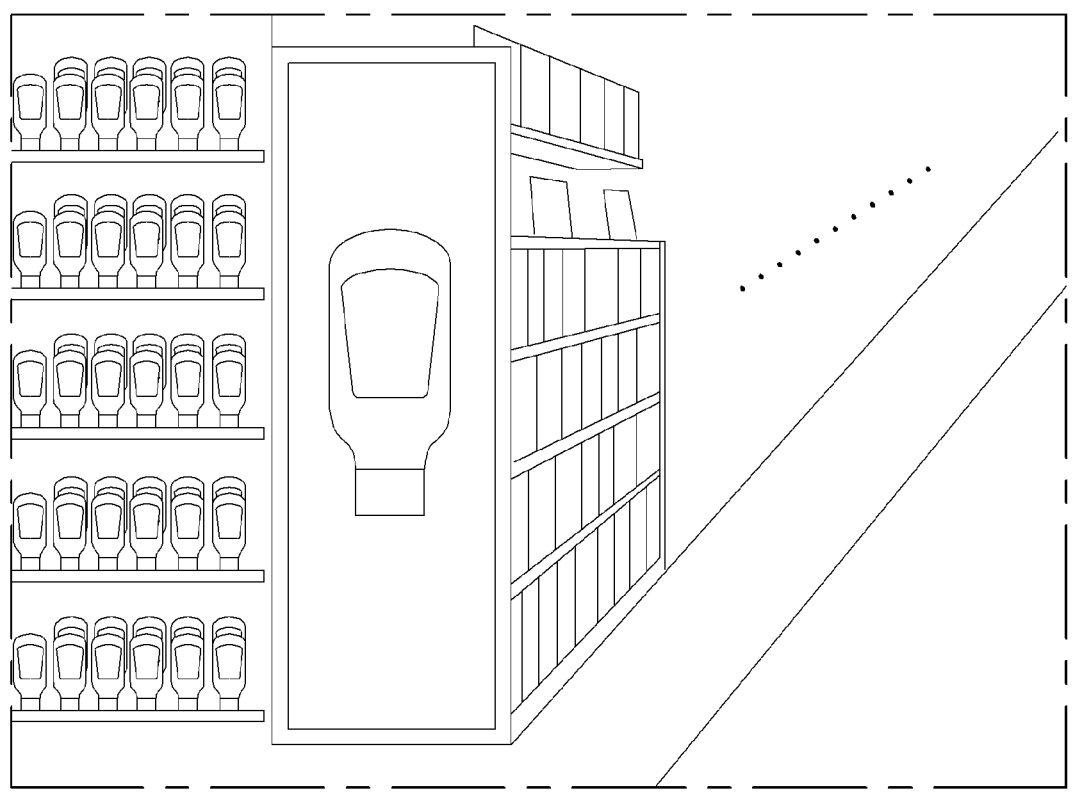
FIG. 20 and FIG. 21 illustrate an actual example of the interface shown in FIG. 18 and FIG. 19.
Figure 21:
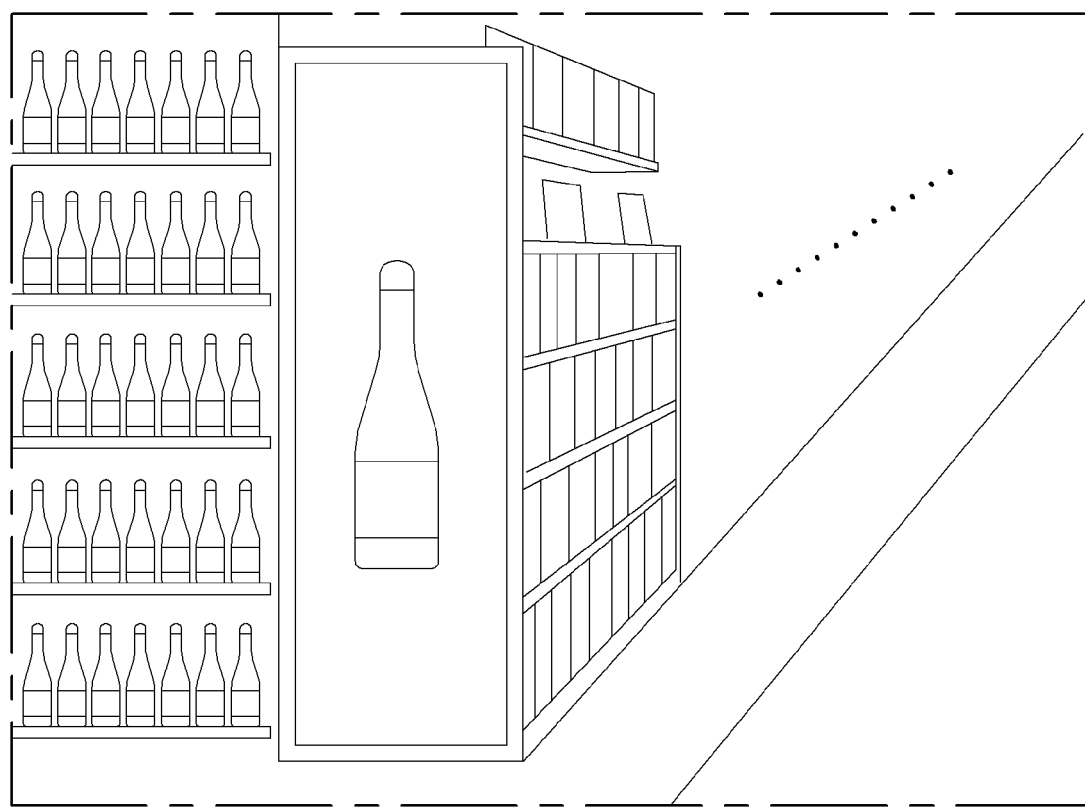

FIG. 18 and FIG. 19 illustrate exemplary operations respective to a connection between a digital signage display and a smart-shelf according to an exemplary embodiment of the present invention. And, FIG. 20 and FIG. 21 illustrate an actual example of the interface shown in FIG. 18 and FIG. 19.

FIG. 18 and FIG. 19 respectively illustrate a case when only one type of product is displayed on each smart-shelf.

Herein, referring to the above-presented description of FIG. 17, when one type of product is displayed on all of the shelves, the smart-shelf may consistently provide basic information on the corresponding product, and advertisement and promotion information related to the corresponding product, as shown in FIG. 18 to FIG. 21, so that the E-price tag unit can provide the respective tag information, and so that the digital signage display can allow a customer to easily recognize the corresponding product by catching the customer's attention and increase the customer's wish to purchase the corresponding product.

Figure 22:
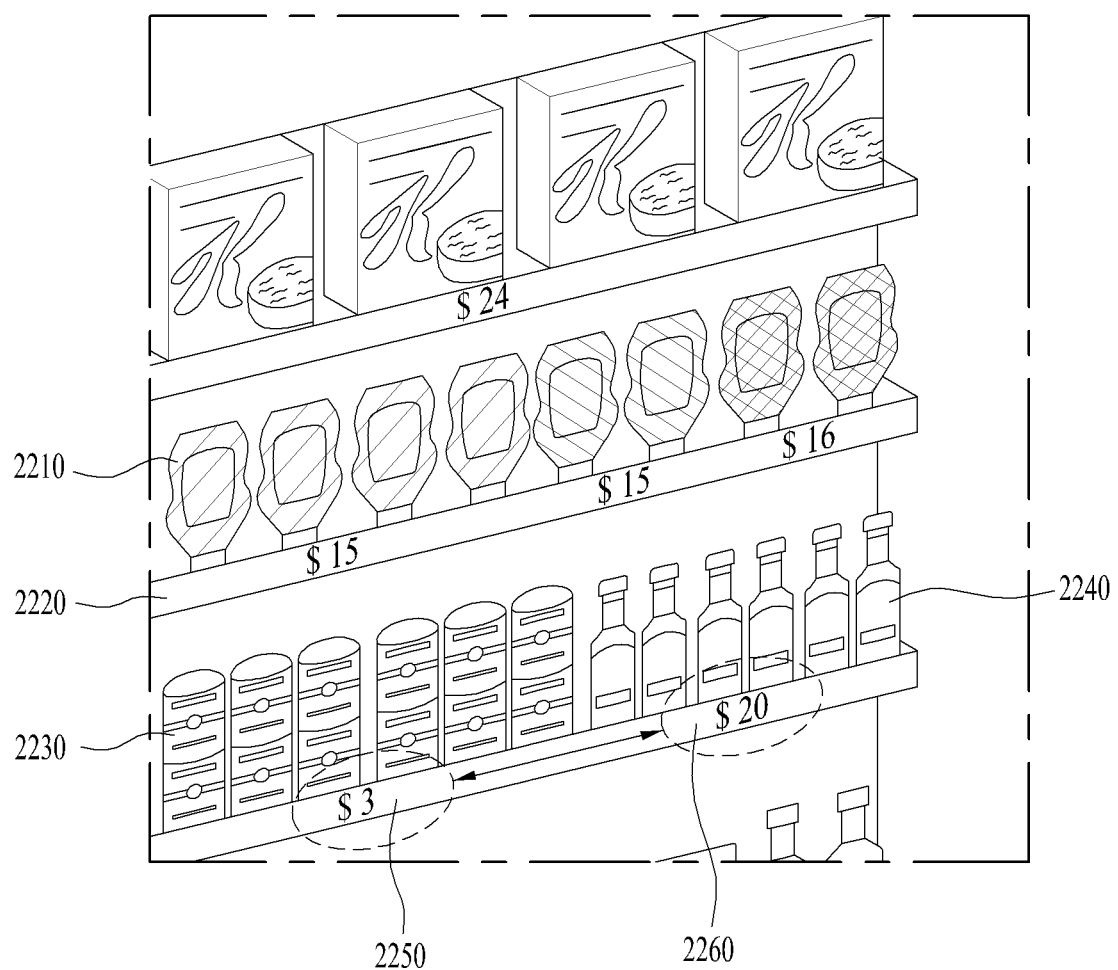
FIG. 22 and FIG. 23 illustrate an exemplary interface providing tag information from the above-described smart-shelf according to the present invention.
Figure 23:
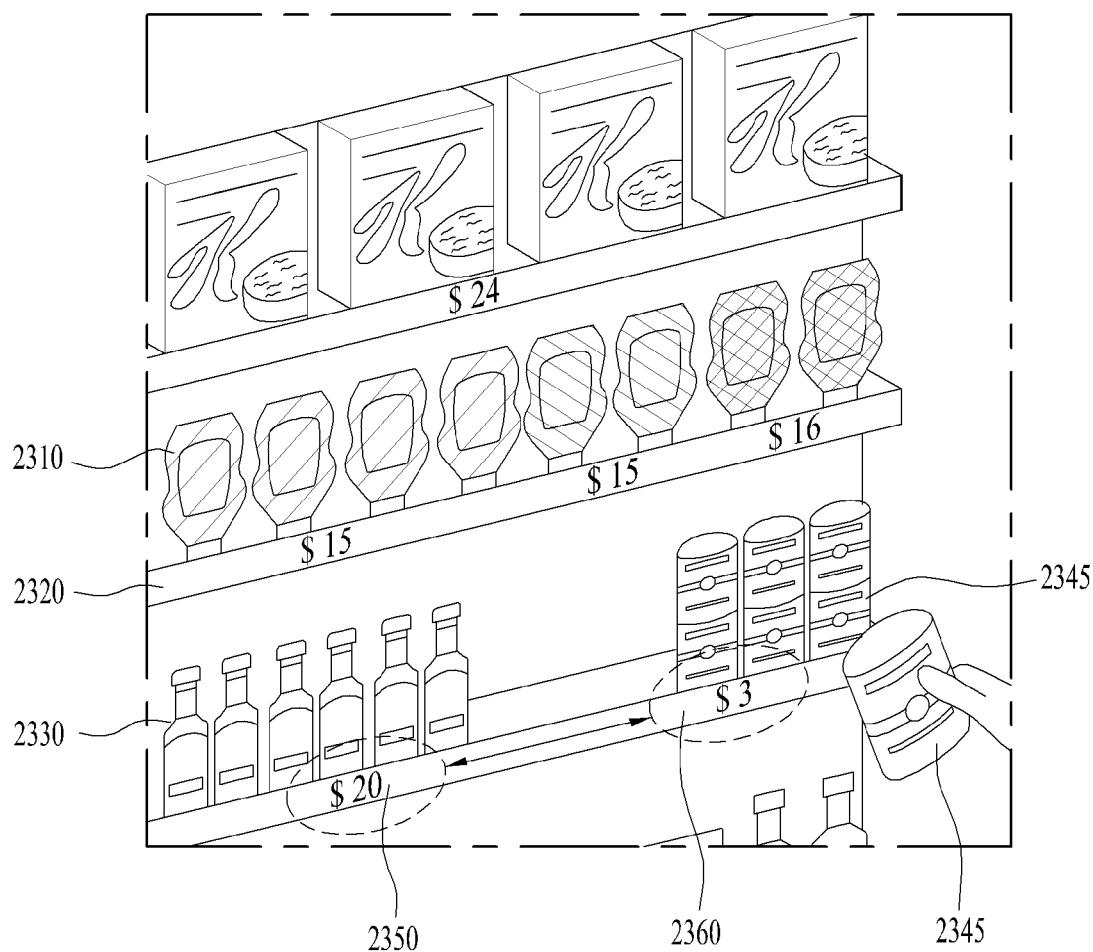

FIG. 22 and FIG. 23 illustrate an exemplary interface providing tag information from the above-described smart-shelf according to the present invention.

As shown in FIG. 22, a plurality of shelves exists, the same type of products is displayed on the highest shelf, the same type of products having different specifications 2210 is displayed on the next shelf (i.e., second highest shelf), and different types of products 2230 and 2240 are displayed on the lower shelf.

As described above, in the second highest shelf, although the same type of products is displayed, the smart-shelf according to the present invention may recognize that the products displayed on the second highest shelf have different price tags and may, therefore, provide the respective tag information 2220.

In other words, in the second highest shelf, if Product 1 and Product 2 both cost 15 dollars ($15), and if Product 3 corresponds to the same product type but costs 16 dollars ($16), the smart-shelf may not only recognize the type of the corresponding product but may also recognize another product corresponding to the same product type, thereby being capable of providing different price information.

Furthermore, in the lower shelf, two products A/B each corresponding to a different product type exist, and price information 2250 of Product A 2230, which is displayed on a left section of the shelf, and price information 2260 of Product B 2240, which is displayed on a right section of the shelf, are provided. Herein, referring to FIG. 23, it will be apparent that the display sections of the products are switched from left to right (and from right to left) in the lower shelf.

In this case, according to the present invention, since each product type may be recognized from the corresponding shelf, the product types may be easily recognized even if the display positions are changed, as described above. And, accordingly, by providing tag information including the corresponding price information with respect to the changed display positions, the present invention may prevent user error from occurring.

Figure 24:
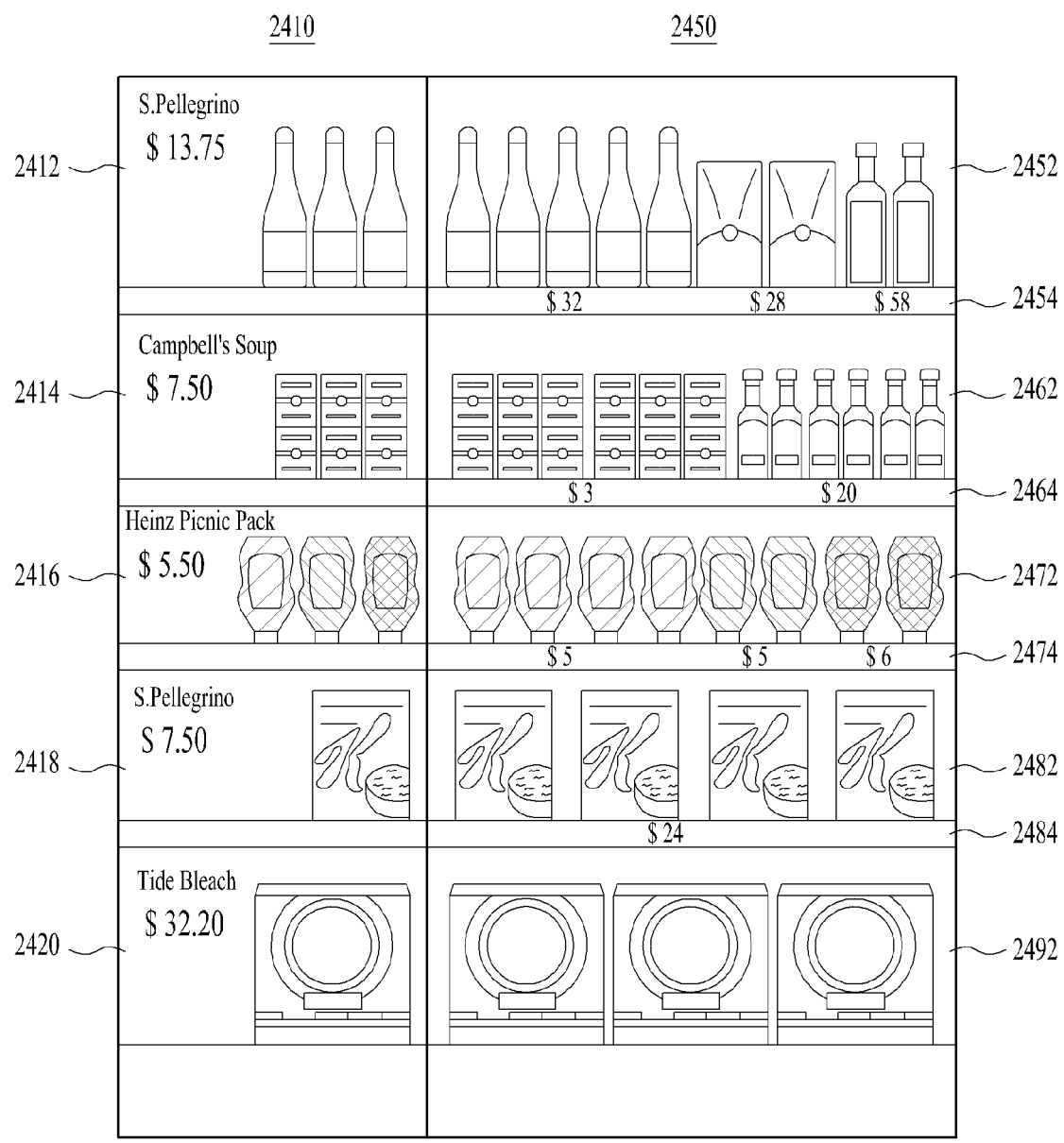
FIG. 24 and FIG. 25 illustrate an exemplary display method of a digital signage display being connected with a smart-shelf according to the present invention.
Figure 25:
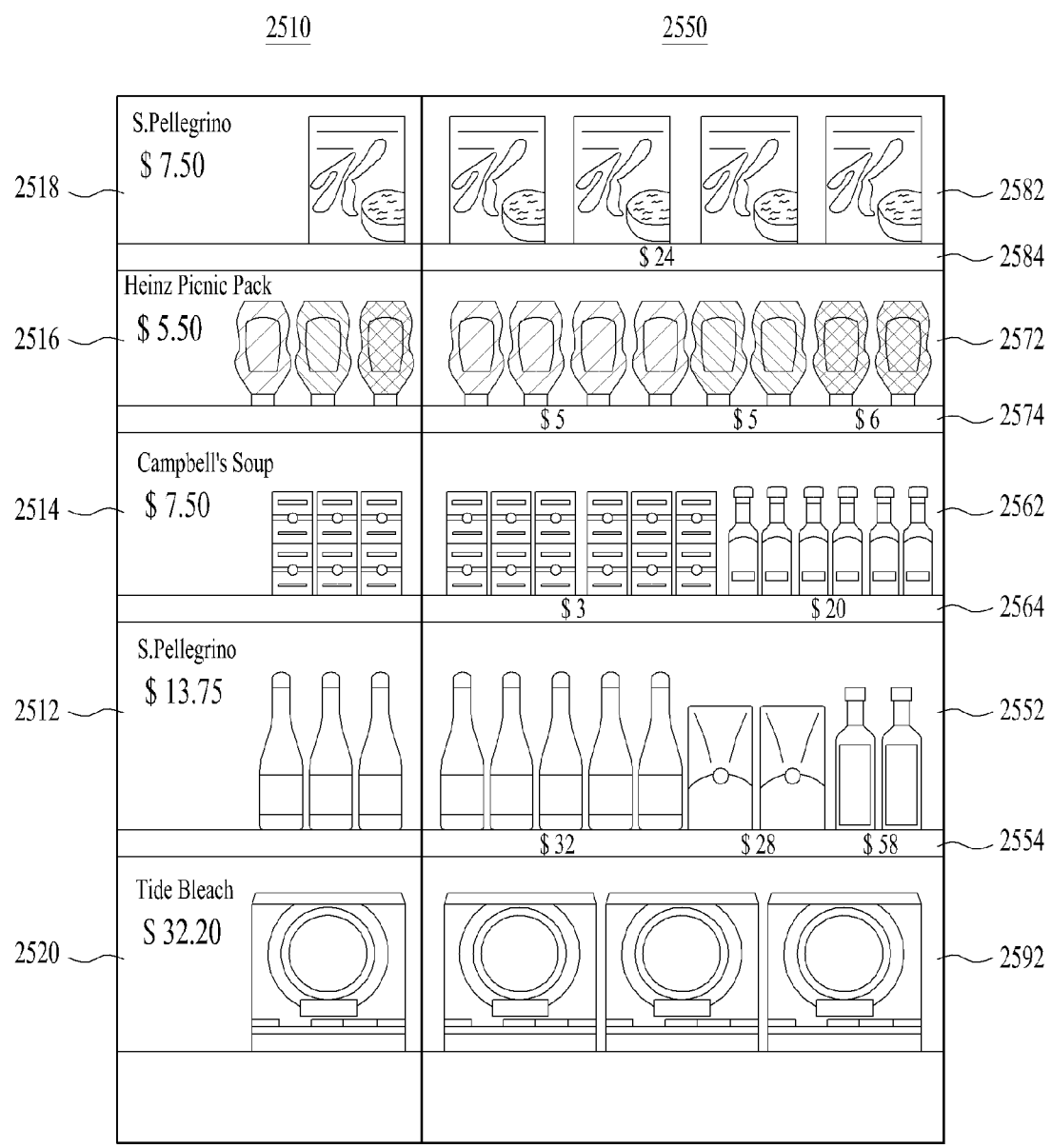

Additionally, FIG. 24 and FIG. 25 illustrate an exemplary display method of a digital signage display being connected with a smart-shelf according to the present invention.

Referring to FIG. 24 and FIG. 25, the digital signage display may be configured by using the same configuration method as the smart-shelf, which operates in connection with the digital signage display. For example, when the smart-shelf consists of 5 shelves, the digital signage display may also be configured of multiple vertical sections (or floors) and output product information of the corresponding shelves.

For example, as shown in FIG. 24 and FIG. 25, the digital signage display 2410/2510 is configured to display a display screen showing the same display position of the products on each shelf in an area next to the displayed products, so as to provide information on the products displayed on the corresponding shelf. Herein, for example, when only one type of product is positioned and/or displayed on each shelf, the digital signage display 2410/2510 only displays information on the corresponding product. However, in case two or more different types of products are displayed on the same shelf, the digital signage display 2410/2510 may consistently and sequentially provide information on each product type at a predetermined time interval, or, when a customer touches a corresponding section of the screen, the digital signage display 2410/2510 may provide the information respective to the touched (or selected) product type. Additionally, in the above-described case, when a change in the display occurs (e.g., rearrangement of products), a predetermined display section of the display screen respective to the corresponding shelf may be changed in connection with the smart-shelf 2420/2520.

Furthermore, the digital signage display 2410/2510 provides the display screen shown in FIG. 24 and FIG. 25 as a main display screen. And, by adding a sensor, the digital signage display 2410/2510 may recognize a user (or customer). Then, the digital signage display 2410/2510 may sequentially provide the user with product information corresponding to each shelf on a single display screen by enlarging the displayed information. Alternatively, the digital signage display 2410/2510 may select a product type, which may most interest the corresponding user, from the adjacent smart-shelf 2420/2520, based upon information on the recognized user, such as list of past purchase history, age information, information on product of interest, and so on. Then, the digital signage display 2410/2510 may either enlarge the corresponding information or output the respective information. Moreover, based upon the customer information, when the information currently being displayed in the smart-shelf 2420/2520 does not include the customer information, the required information may be received from another digital signage display or smart-shelf, thereby being provided to the corresponding customer (or user). And, in accordance with the customer's request, the respective location information may also be provided.

FIG. 26 illustrates an exemplary data format that is used by a server for controlling a multi-system according to an exemplary embodiment of the present invention.

Hereinafter, the exemplary data format that is used by a server for controlling a multi-system according to an exemplary embodiment of the present invention will be described in detail with reference to FIG. 26.

First of all, the server according to the embodiment of the present invention collects information on the number of people located within the store (or supermarket). For example, as a method for collecting the information on the number of people located within the store, a digital card may be attached (or fixed) to a shopping cart. Herein, the digital card includes customer ID information. Therefore, the server may estimate the number of people located within the store by counting (or calculating) the number of digital cards assigned to the shopping carts.

As shown in FIG. 26, information on the operation mode of the multi-system, which changes in accordance with the total number of people within the store, is stored in the database of the server. For example, when the total number of people within the store is calculated to be equal to or greater than N, the air conditioner is set to Mode 1, the lighting system is set to Mode 3, and the audio system is set to Mode 5.

Meanwhile, when the total number of people within the store is calculated to be less than N, the air conditioner is set to Mode 2, the lighting system is set to Mode 4, and the audio system is set to Mode 6.

More specifically, depending upon the number of customers estimated and calculated by the server, each device belonging to the multi-system may change its set-up mode (or set-up status). This will be described in more detail later on with reference to FIG. 27.

FIG. 27 illustrates another exemplary data format that is used by a server for controlling a multi-system according to an exemplary embodiment of the present invention.

The other exemplary data format that is used by a server for controlling the multi-system according to the exemplary embodiment of the present invention will now be described with reference to FIG. 27.

When the total number of customers within the supermarket is calculated to be equal to or greater than N (e.g., 1000 customers), the server generates a command signal changing the temperature settings of the air-conditioner to 23 degrees Celsius (23° C.). Also, the server generates a command signal changing the light tone emitted from the lighting system to the color red. And, the server generates a command signal changing the music outputted from the audio system to Pop Music. The generated command signals are each transmitted to the respective multi-system. According to the present invention, when the number of customers in the supermarket is relatively high, such change in the system settings is devised and intended to accelerate the movement of the customers and to lead the customers to purchase more products in a more cheerful environment.

Meanwhile, when the total number of customers within the supermarket is calculated to be less than N (e.g., 1000 customers), the server generates a command signal changing the temperature settings of the air-conditioner to 25 degrees Celsius (25° C.). Also, the server generates a command signal changing the light tone emitted from the lighting system to the color blue. And, the server generates a command signal changing the music outputted from the audio system to Classic. The generated command signals are each transmitted to the respective multi-system. According to the present invention, when the number of customers in the supermarket is relatively low, such change in the system settings is devised and intended to slow down the movement of the customers and to lead the customers to purchase more products in a more relaxed and calm environment.

Evidently, the numbers given in FIG. 27 are merely exemplary. And, therefore, the scope of the present invention will not be limited only to the examples presented herein.

Figure 28:
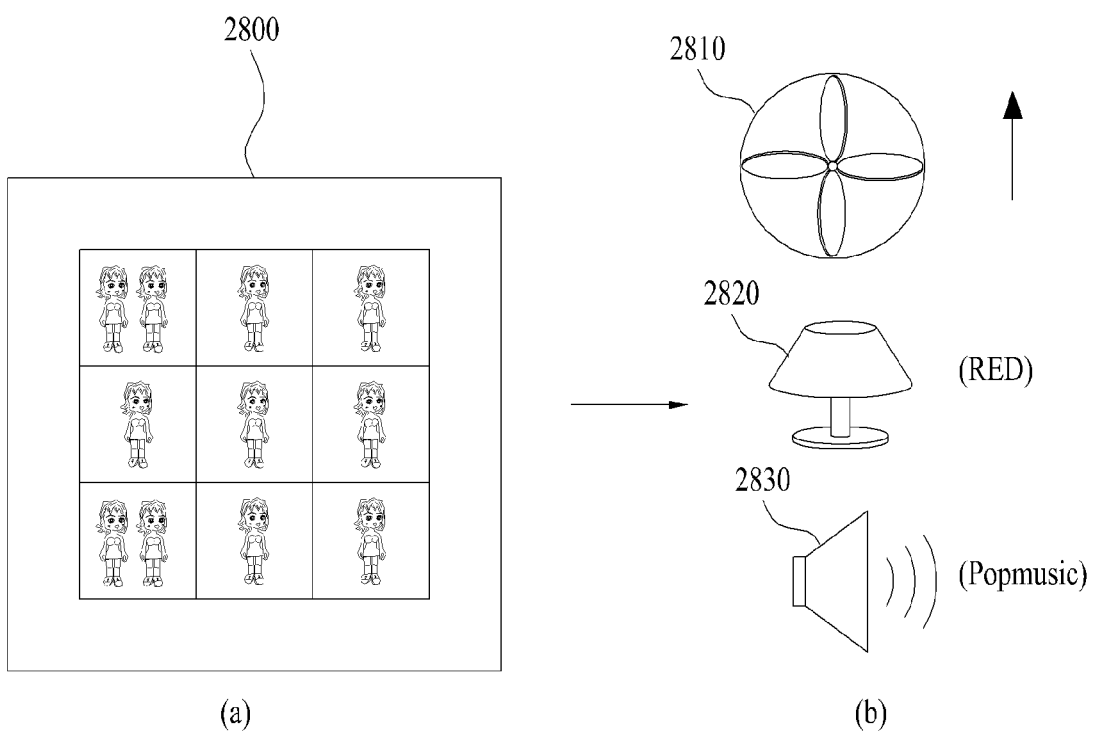
FIG. 28 illustrates a first operation mode of the multi-system respective to a number of customers located within a supermarket according to the present invention.

FIG. 28 illustrates a first operation mode of the multi-system respective to a number of customers located within a supermarket according to the present invention.

Hereinafter, the first operation mode of the multi-system respective to the number of customers located within the supermarket according to the present invention will be described in detail with reference to FIG. 28.

As shown in FIG. 28(*a*), it is assumed that the number of customers located in the supermarket 2800 is equal to or greater than a predetermined number (N). As described above, the server according to the embodiment of the present invention may estimate the number of customers located in the supermarket 2800 by referring to the number of digital cards assigned to each customer. Also, as shown in FIG. 26 or FIG. 27, the server generates control signals for controlling each multi-system device and transmits the generated control signals to the respective multi-system devices.

As shown in FIG. 28(*b*), depending upon the command signals received from the server, an air conditioner 2810, which is an exemplary multi-system device, increases its cooling function so that the temperature settings can be decreased to a lower temperature. Also, depending upon the command signals received from the server, a lighting system 2820, which is another exemplary multi-system device, changes the light settings within the supermarket to the color red. Furthermore, an audio system 2830, which is yet another exemplary multi-system device, changes its music settings to Pop music. This is advantageous in that, by accelerating the shopping speed of the customers, the customer circulation may be realized more swiftly.

Evidently, instead of the settings shown in FIG. 28(*b*), the scope of the present invention may also include changing the supermarket environment (or ambience) to a different temperature, color, and music genre.

Figure 29:
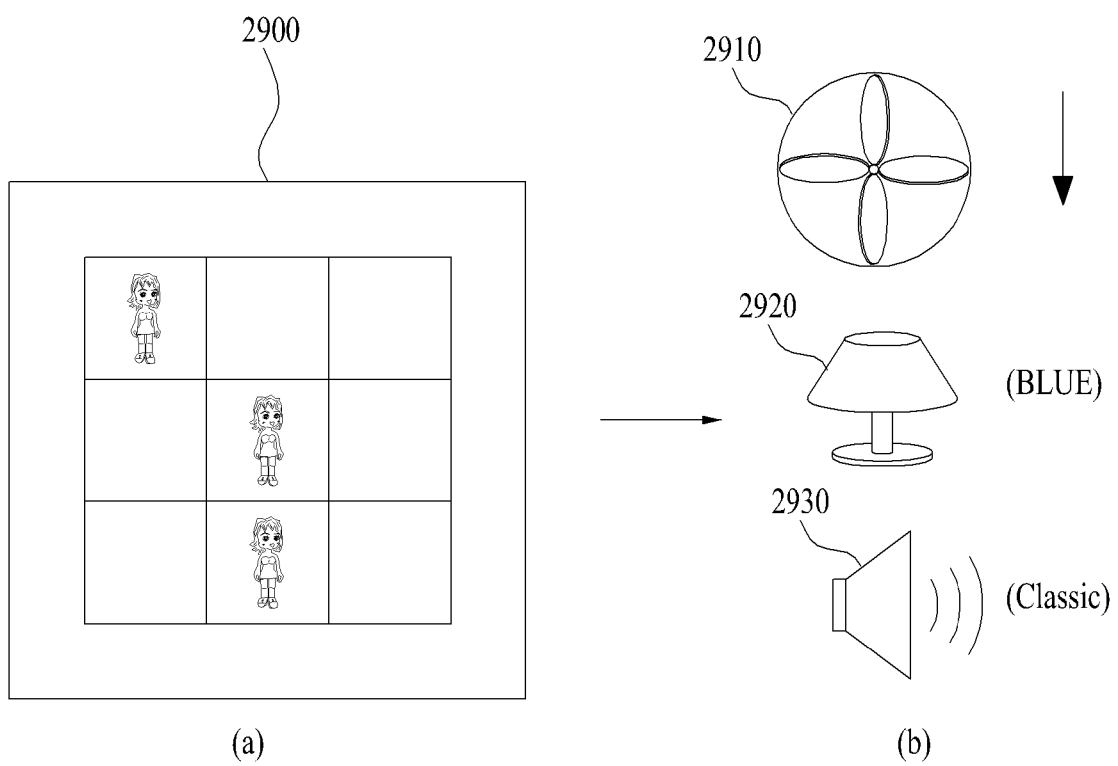
FIG. 29 illustrates a second operation mode of the multi-system respective to a number of customers located within a supermarket according to the present invention.

FIG. 29 illustrates a second operation mode of the multi-system respective to a number of customers located within a supermarket according to the present invention.

Hereinafter, the second operation mode of the multi-system respective to the number of customers located within the supermarket according to the present invention will be described in detail with reference to FIG. 29.

As shown in FIG. 29(*a*), it is assumed that the number of customers located in the supermarket 2900 is less than a predetermined number (N). As described above, the server according to the embodiment of the present invention may estimate the number of customers located in the supermarket 2900 by referring to the number of digital cards assigned to each customer. Also, as shown in FIG. 26 or FIG. 27, the server generates control signals for controlling each multi-system device and transmits the generated control signals to the respective multi-system devices.

As shown in FIG. 29(*b*), depending upon the command signals received from the server, an air conditioner 2910, which is an exemplary multi-system device, decreases its cooling function so that the temperature settings can be increased to a higher temperature. Also, depending upon the command signals received from the server, a lighting system 2920, which is another exemplary multi-system device, changes the light settings within the supermarket to the color blue. Furthermore, an audio system 2930, which is yet another exemplary multi-system device, changes its music settings to Classic music. Accordingly, by providing a more relaxed and pleasant ambience (or environment) to the customers, the customers may feel more at ease in taking his or her time shopping. Also, by extending (or maximizing) the customers' visit, the present invention may allow the customers to purchase more products.

Evidently, instead of the settings shown in FIG. 29(*b*), the scope of the present invention may also include changing the supermarket environment (or ambience) to a different temperature, color, and music genre.

Figure 30:
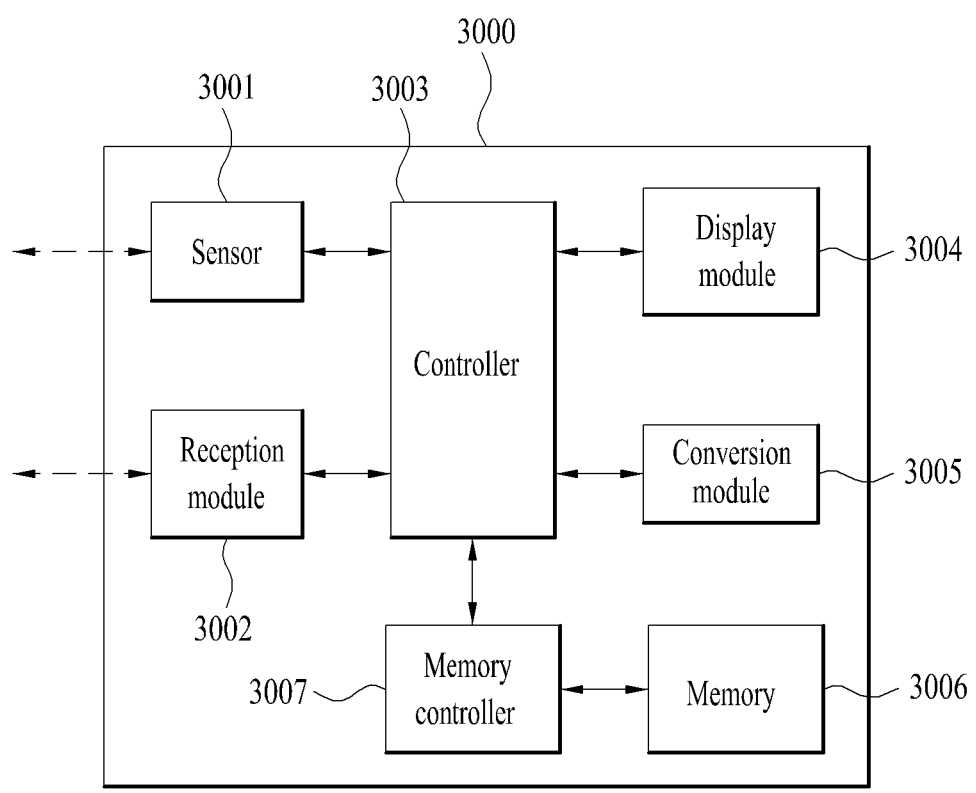
FIG. 30 illustrates a detailed block view showing elements configuring a display device according to an exemplary embodiment of the present invention.

FIG. 30 illustrates a detailed block view showing elements configuring a display device according to an exemplary embodiment of the present invention. Hereinafter, elements configuring the display device according to the exemplary embodiment of the present invention will be described in more detail with reference to FIG. 30. The display device shown in FIG. 30 corresponds to the display device that has been described above with reference to FIG. 1 or FIG. 2. Furthermore, the display device of FIG. 30 has external features corresponding to the digital signage display shown in FIG. 14 to FIG. 16.

As shown in FIG. 30, the display device 3000 according to the embodiment of the present invention includes sensor 3001, a reception module 3002, a controller 3003, a display module 3004, a conversion module 3005, a memory 3006, and a memory controller 3007. Evidently, by principle, the scope of the present invention should be decided in accordance with the appended claims of the present invention. Therefore, the scope of the present invention shall also include configuring the display device by deleting (or omitting) some of the components, or by adding new elements that are not shown in FIG. 30 to the structure shown in FIG. 30.

The display module 3004 is designed to display Mode 1. Herein, for example, Mode 1 corresponds to a random advertisement screen.

The sensor 3001 senses (or detects) whether or not a random mobile device is located within a predetermined distance range from the display device 3000. Herein, the mobile device corresponds to a shopping cart or a mobile phone. Evidently, the scope of the present invention includes sensing the user himself (or herself) using the corresponding mobile device.

When the random mobile device is located within a predetermined distance range from the display device 3000, the conversion module 3005 is designed to shift (or convert) the operation mode (or display mode) from Mode 1 to Mode 2. For example, Mode 2 includes graphic data indicating that the display device 3000 is prepare to respond (or answer) to the questions asked by the customer, as shown in FIG. 16a.

The reception module 3002 receives a command signal respective to a specific product. At this point, for example, the command signal is designed to have an audio data format, a voice data format, and so on.

The memory 3006 stores at least one or more sets of guide information respective to at least one or more products. The memory controller 3007 accesses the memory 3006 so as to extract guide information respective to the specific product. Meanwhile, for example, the guide information may be designed to be received from the server according to the present invention.

Also, the controller 3003 controls the display module 3004, so that the display module 3004 can display Mode 3, which includes graphic data indicating the extracted guide information. For example, Mode 3 includes at least one or more sets of graphic data shown in FIG. 16b to FIG. 16f.

When the display device is designed as described above, the number of employees positioned on in the supermarket may be minimized, and the customers may be capable quickly verifying the information corresponding to the product he (or she) is interested in purchasing. Also, the display device according to the embodiment of the present invention is advantageous in that the customers can verify a large amount of real-time data in a short period of time.

According to another embodiment of the present invention, the display device 3000 shown in FIG. 30 may further include a voice detector configured to detect the voice of a user of a mobile device (e.g., shopping cart), and a voice recognition unit interpreting the detected voice. Furthermore, the display device 3000 may further include a voice converter configured to convert the extracted guide information to audio data, and an audio output unit configured to output the converted audio data.

Meanwhile, the embodiment of the present invention may also be implemented by adopting the already disclosed voice recognition technology. For example, Acoustic Modeling refers to defining basic units of a statistical model, which is used for the voice recognition process, and learning the defined basic units. Also, Key-Word Spotting refers to a mandatory course required for understanding sound (or audio data), by extracting a keyword from a given set of audio (or voice) data. Additionally, other voice recognition technologies may be applied in the present invention.

The controller 3003 performs control operations so that $1^{st}$ graphic data configured to indicate location information of the specific product and $2^{nd}$ graphic data configured to indicate manual information related to the specific product. This may be understood more easily by referring to FIG. 16.

For example, the sensor 3001 corresponds to any one of an infrared sensor, a Radio Frequency Identification (RFID) sensor, or a Near Field Communication (NFC) sensor. In case the sensor 3001 corresponds to the infrared sensor, the scope of the present invention may include designing the display device so that the sensor 3001 can communicate with the digital card attached to the shopping cart via infrared communication.

Figure 31:
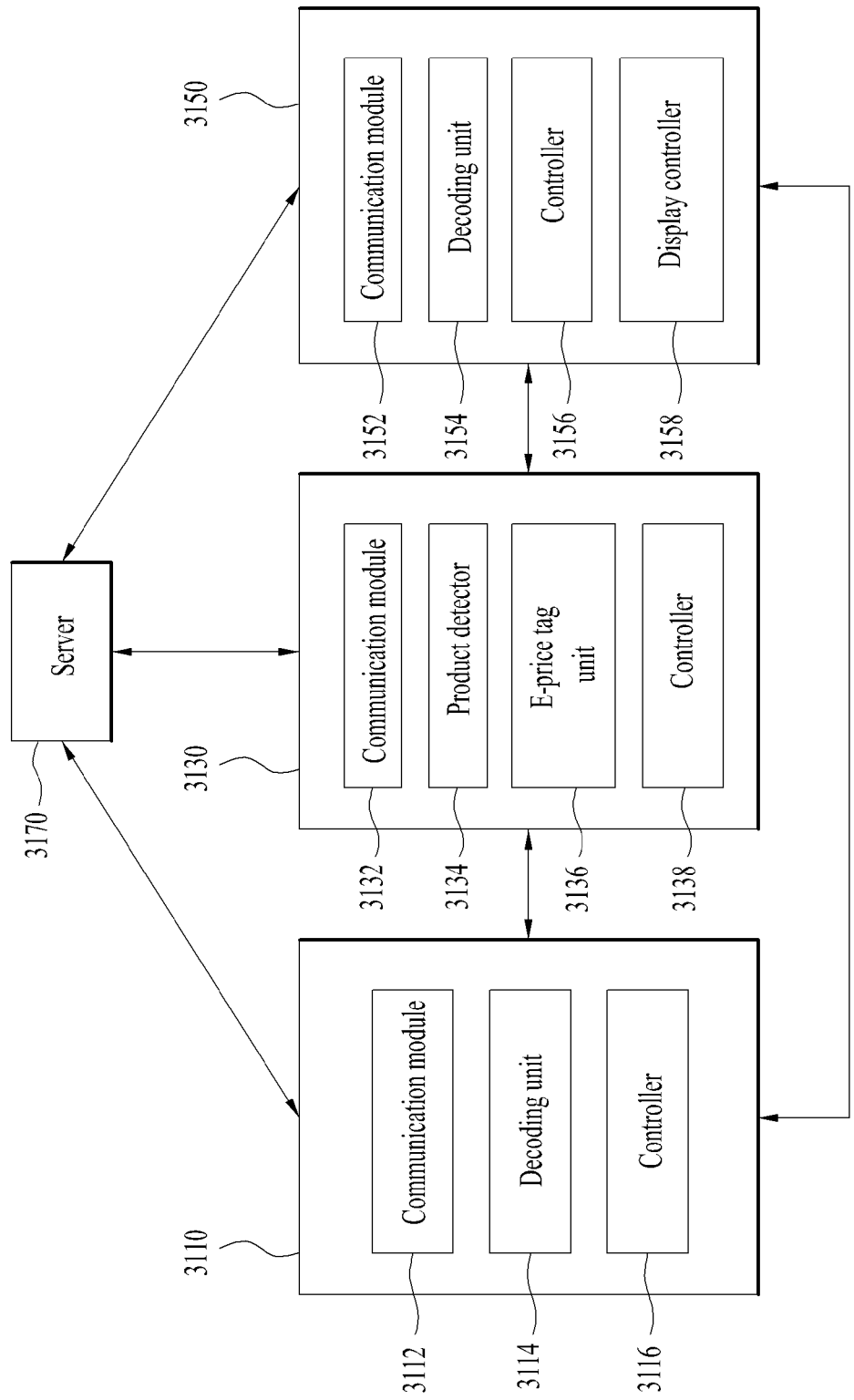
FIG. 31 illustrates a detailed block view showing a structure of a system for controlling a store according to the present invention.

FIG. 31 illustrates a detailed block view showing a structure of a system for controlling a store according to the present invention.

The system for controlling a store includes a digital display shelf being provided with a recognition unit configured to recognize a product displayed on the shelf and an output unit configured to output information on the recognized product, a digital signage display configured to output data respective to the recognized product, and a managing system configured to communicate with the digital display shelf and the digital signage display so as to transmit control data and to receive processing data. Herein, the data respective to the recognized product may include at least one of audio data, video data, and text data configured to advertise and promote the corresponding product, and the managing system may include a database related to the data respective to the recognized product. Furthermore, the system for controlling the store may further include a server configured to communicate with the digital display shelf, the digital signage display, and the managing system, so as to transmit and receive data to and from the digital display shelf, the digital signage display, and the managing system.

The digital display shelf may further include a communication module configured to support wireless and/or wired communication and to transmit and receive data. The recognition unit included in the digital display shelf may include a detection sensor configured to sense a weight of a predetermined section of the display shelf. Herein, the recognition unit may communicate with the managing system, so as to receive product data respective to the sensed weight, thereby recognizing the corresponding product. Also, the recognition unit included in the digital display shelf may include a camera sensor or an infrared sensor configured to acquire an image of the product positioned in a predetermined section of the digital display shelf. Herein, the recognition unit may communicate with the managing system, so as to receive product data corresponding to the acquired image, thereby recognizing the corresponding product. Furthermore, the recognition unit included in the digital display shelf may include a sensor configured to acquire an image of the product positioned in a predetermined section of the digital display shelf. Herein, the recognition unit may communicate with the managing system, so as to receive product data respective to the sensed weight and corresponding to the acquired image, thereby recognizing the corresponding product. And, the output unit is configured to communicate with the managing system so as to receive electronic-price tag information, which is recognized by the recognition unit, and to output the received information to a predetermined section of the digital display shelf respective to the corresponding product in a text data format.

The digital signage display may include a communication module configured to support wireless and/or wired communication and to transmit and receive data, a decoding unit configured to decode data being received from the managing system and the digital display shelf through the communication module, and a display unit. Also, the digital signage display is divided into predetermined sections in row or column units based upon an alignment method of the products displayed on the digital display shelf. And, the digital signage display is configured to output data respective to at least one or more products displayed on the digital display shelf, the products corresponding to each of the divided sections. Furthermore, the digital signage display is also configured to communicate with a user terminal of a customer being recognized to be located within a predetermined range, receive at least one of customer information and purchase list information, and output data respective to a related product among a plurality of products recognized from the display shelf or data respective to a related product received from a managing system, based upon the at least one of the received customer information and purchase list information.

Referring to FIG. 31, an exemplary store controlling system 3100 may include a POS 3110, a smart-shelf 3130, and a digital signage display 3150. Herein, the store controlling system 3100 may either be provided with a server 3170 inside the system or may communicate with an external server so as to perform the required processing operations.

Herein, the POS 3110, which corresponds to a managing system for the entire store, may include a communication module 3112, a decoding unit 3114, and a controller 3116. Additionally, the POS 3110 essentially includes a display device.

The communication module 3112 may transmit and/or receive data to and/or from the smart-shelf 3130, the digital signage display 3150, and the server 3170.

Audio, video, and text data being received from the smart-shelf 3130, the digital signage display 3150, the server 3170, and also the decoding unit 3114 are decoded.

The controller 3116 may perform control operations so that the decoded data can be outputted to a display unit and may also control the management of the entire store including the transmission and/or reception of the related data.

The controller 3116 is also internally provided with a separate database, thereby being capable of storing data related to the store.

Herein, the data related to the store includes all types of information required for managing and controlling the store, such as position information of all smart-shelves, digital signage displays, and individual POSs provided in the store, as well as all facilities and equipments installed in the store, identification information respective to each smart-shelf and digital signage display, identification information respective to each product, basic information and additional information, such as name of product, product size, unit price, number of stored products (i.e., number of available products), number of sold products, and so on, information respective to the products positioned and displayed in each smart-shelf, payment related information, and so on.

The controller 3116 communicates with the server 3170 so as to periodically and/or aperiodically determine whether or not the data related to the store, which are stored in the internal database, have been updated. Then, based upon the determined result, the controller 3116 may download only the required data, thereby continuously updating the database.

Additionally, the POS 3110 may periodically and/or aperiodically communicate with the smart-shelf 3130 and/or the digital signage display 3150, so as to transmit and/or receive the respective data.

In relation with the payment process, the POS 3110 may communicate with an external payment server whenever required, so as to carry out and process the payment process.

The smart-shelf 3130 may be configured of a communication module 3132, a product detector 3134, an electronic-price tag unit (E-price tag unit) 3136, and a controller 3138. And, whenever required, the smart-shelf 3130 may also include a decoding unit configured to decode the respective data, and a memory configured to store the decoded data.

The communication module 3132 transmits and/or receives data to and/or from the POS 3110, the digital signage display 3150, and database cloud by performing wired and/or wireless communication.

The product detector 3134 consists of at least one of the above-described sensor, camera, and so on, and the product detector 3134 acquires data for recognizing products positioned and displayed on a predetermined section of a display shelf. The product detector 3134 transmits the acquired product recognition data to the database cloud, the POS 3110, the server 3170, and so on, so as to be capable of receiving the data for recognizing products or determining whether or not an error occurs in the product recognition data.

The E-price tag unit 3136 receives electronic-price data (or E-price data), which are acquired from the product detector 3134 and uploaded, or which are separately transmitted from the product detector 3134, from the database cloud, the POS 3110, the server 3170, and so on. And, then, the E-price tag unit 3136 outputs the received E-price data to a predetermined section of the display shelf.

The controller 3138 controls the overall process steps of the above-described procedure. And, when required, the controller 3138 may communicate with the server in real-time, so as to store the data acquired or received from the product detector 3134 and the E-price tag unit 3136. Alternatively, the controller 3138 may also process the corresponding data in the form of database and may store the converted database format data in an internal memory.

The digital signage display 3150 consists of a communication module 3152, a decoding unit 3154, a controller 3156, and a display controller 3158. Herein, the digital signage display 3150 may further includes a memory, which is configured to store required data. And, the digital signage display 3150 essentially includes a display device.

The communication module 3152 may communicate with the POS 3110, the smart-shelf 3130, the server 3170, and so on via wired and/or wireless communication, and the communication module 3152 may also communicate with other digital signage displays.

The decoding unit 3154 may decode data received from an outside source or data stored within the system into a format that can be outputted to the display device 3156.

The controller 3156 controls the overall process of the digital signage display 3150. And, the controller 3156 may also control the display controller 3158, so as to be capable of controlling the output of the data, which are decoded by the decoding unit 3154, being outputted through the display device.

The display controller 3158 is controlled by the controller so as to control the output of the processed data through the display device. The display controller 3158 may perform control operations enabling a related UI to be generated (or created) and outputted. Herein, for example, the display controller 3158 may perform control operations for outputting a UI having the same format as the digital signage display shown in FIG. 18 to FIG. 20 and also shown in FIG. 24 and FIG. 25.

The above-described controller 3156 and display controller 3158 may be configured of a single module or may be configured as separate modules, as shown in FIG. 31.

As described above, each of the POS 3110, the smart-shelf 3130, the digital signage display 3150, and the server 3170 may perform data transmission and/or reception between one another by using a close-range wireless communication network, such as ZigBee, Wi-Fi, Bluetooth, and so on, or by using a wired communication network, such as TCP/IP, LAN, and so on.

The above-described store controlling system and method for the same have the following advantages. First of all, the products that are positioned or displayed on the display shelves may be automatically recognized. Secondly, an E-price tag data respective to the product recognized from the display shelf may be outputted and provided. And, the related advertisement and promotion information may be outputted through the digital signage display. Thirdly, an automation system may be established in the store. Fourthly, by automatically processing changes in the products within the store in real-time and by automatically updating the processed changes, the store may prevent the customers or consumers from experiencing confusion due to the outdated product information. Fifthly, by providing an automation system for processing payment, for example, the store may enhance customer convenience, and, by providing diverse data, the store may promote the customers shopping wish and needs. Sixthly, the system may also maximize the overall efficiency in managing and operating the store. Seventhly, by analyzing the users (or customers) located in the store, a solution that can automatically adjust multi-system settings within the store may be provided. Eighthly, based upon the movement of the customers within the store, a system outputting optimized information may also be provided. Finally, the present invention allows the store to minimize the number of employees managing the store and, also, to provide a protocol enabling the customers within the store to quickly and easily access the information that they need.

Furthermore, although the drawings have been distinguished and divided in order to facilitate the description of the present invention, the present invention may be designed to form a new embodiment by combining some of the above-described embodiments of the present invention. Moreover, whenever required by anyone skilled in the art, the scope of the present invention includes designing a recording medium readable by a computer, the computer having a program for executing the above-described embodiments of the present invention recorded therein.

The display device and the method for operating the same according to the present invention may not be limited only to the above-described configuration and methods according to the exemplary embodiments of the present invention. Accordingly, variations of the exemplary embodiments of the present invention may be configured by selectively combining each exemplary embodiment of the present invention fully or in part.

Meanwhile, the method of operating the display apparatus according to the present invention may be realized as a code that can be read by a processor provided in the image display device in a recording medium that can be read by a processor. The recording medium that can be read by the processor includes all types of recording devices storing data that can be read by the processor. Examples of the recording media that can be read by a processor may include ROMs, RAMs, CD-ROMs, magnetic tapes, floppy disks, optical data storing devices, and so on. Also, an exemplary recording medium being realized in the form of a carrier wave, such as a transmission via Internet, may also be included. Also, the recording medium that can be read by a processor may be scattered within a computer system, which is connected through a network. And, a code that can be read by the processor may be stored and executed by using a dispersion (or scattering) method.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. It is also apparent that such variations of the present invention are not to be understood individually or separately from the technical scope or spirit of the present invention.

Also, a device invention and a method invention are both described in this specification of the present invention. Therefore, whenever required, the description of both inventions may be supplementarily applied.

What is claimed is:
1. A system for controlling a store, the system comprising:
a digital shelf including:
    a recognition unit configured to recognize a product disposed on the digital shelf, and
    an output unit configured to output information on the recognized product;
a digital signage display configured to output promotion data on the recognized product; and
a managing controller configured to transmit control data for the output promotion data and receive processing data in response to the transmitted data to at least one of the digital shelf and the digital signage display,
wherein the promotion data respective to the recognized product includes at least one of audio data, video data, and text data configured to advertise and promote the corresponding product, and
wherein the managing controller includes a database related to the promotion data respective to the recognized product,
wherein the digital signage display is configured to communicate with a user terminal, receive information on a purchase list from the user terminal, output product information which corresponds to the received purchase list information, and receive an input for selecting to purchase at least one product, and
wherein the managing controller is further configured to authenticate the user terminal communication with the digital signage display, generate payment information based upon a basic unit price and a quantity of the at least one product being selected for purchasing, output the generated payment information via the digital signage display and process payment.

2. The system of claim 1, further comprising:
a server configured to communicate with the digital shelf, the digital signage display and the managing controller, so as to transmit and receive data to and from the digital shelf, the digital signage display, and the managing controller.

3. The system of claim 2, wherein the digital shelf further comprises:
a communication module configured to support wireless and/or wired communication and to transmit and/or receive data.

4. The system of claim 3, wherein the recognition unit includes a detection sensor configured to sense a weight of a predetermined section of the digital shelf, and
wherein, the recognition unit communicates with the managing controller, so as to receive product data respective to the sensed weight, thereby recognizing the corresponding product.

5. The system of claim 3, wherein the recognition unit includes a camera sensor or an infrared sensor configured to acquire an image of the product positioned in a predetermined section of the digital shelf, and
wherein the recognition unit communicates with the managing controller, so as to receive product data corresponding to the acquired image, thereby recognizing the corresponding product.

6. The system of claim 4, wherein the recognition unit includes a sensor configured to acquire an image of the product positioned in a predetermined section of the digital shelf, and
wherein the recognition unit communicates with the managing controller, so as to receive product data respective to the sensed weight and corresponding to the acquired image, thereby recognizing the corresponding product.

7. The system of claim 6, wherein the output unit is configured to communicate with the managing controller so as to receive electronic-price tag information, which is recognized by the recognition unit, and to output any received information to a predetermined section of the digital shelf respective to the corresponding product in a text data format.

8. The system of claim 2, wherein the digital signage display comprises:
a communication module configured to support wired and/or wireless communication and to transmit and/or receive data;
a decoding unit configured to decode data received from the managing controller and the digital shelf through the communication module; and
a display unit.

9. The system of claim 8, wherein the digital signage display is divided into a plurality of predetermined sections, in row or column units, based upon a method of positioning products on the digital shelf, and
wherein the digital signage display outputs data respective to at least one of the products displayed on the digital shelf corresponding to each of the plurality of predetermined divided sections.

10. The system of claim 9, wherein the digital signage display communicates with a user terminal of a user being recognized within a predetermined range, so as to receive at least one of customer information and purchase list information, and
wherein the digital signage display outputs data respective to at least one of the products recognized by the digital shelf, based upon the received at least one of customer information and purchase list information, or outputs data respective to a related product received from the managing controller.

11. A method of managing a store through a digital shelf, a digital signage display and a managing controller in a store controlling system, the method comprising:
communicating, at the digital shelf or the digital signage display, with a user terminal;
authenticating, at the managing controller, the user terminal;
receiving, at the digital signage display, information on a purchase list from the user terminal;
outputting, at the digital signage display, product information which corresponds to the received purchase list information;
transmitting, at the digital signage display, location information identifying a location the digital shelf disposed the output product information;
recognizing, at the digital shelf, a product assigned to the digital shelf;
outputting, at the digital signage display, the promotion data related to the recognized product to a predetermined area respective to the corresponding product;
receiving, at the digital shelf or the digital signage display, an input for selecting to purchase at least one product; and
outputting, at the digital signage display, payment information based upon a basic unit price and a quantity of the at least one product being selected for purchasing,
wherein the promotion data related to the recognized product includes at least one of audio data, video data, and text data configured for advertising and promoting the corresponding product, and
wherein the promotion data related to the recognized product is extracted from a database of the store controlling system.

12. The method of claim 11, wherein the store controlling system further comprises a product recognition unit configured to recognize the product assigned to the digital shelf.

13. The method of claim 12, wherein the digital shelf includes a communication module, so as to support wireless and/or wired communication and to transmit and/or receive data.

14. The method of claim 13, wherein the step of recognizing a specific product comprises:
sensing a weight of a predetermined area on the digital shelf; and
receiving product data respective to the sensed weight.

15. The method of claim 13, wherein the step of recognizing a specific product comprises:
acquiring an image of a product located in a predetermined area on the digital shelf; and
receiving product data respective to the acquired image.

16. The method of claim 13, wherein the step of recognizing a specific product comprises:
sensing a weight of a predetermined area on the digital shelf;
acquiring an image of a product located in the predetermined area on the digital shelf; and
receiving product data respective to the sensed weight and the acquired image.

17. The method of claim 16, further comprising:
outputting, at the digital signage display, electronic-price tag data of the corresponding product,
wherein the E-price tag data of the corresponding product is received and output to a predetermined section respective to the corresponding product in a text data format.

18. The method of claim 13, further comprising:
outputting, at the digital signage display, electronic-price tag data of the corresponding product,
wherein the electronic-price tag data of the corresponding product are output from the digital shelf as data related to the recognized product, and
wherein advertisement and promotion data respective to the recognized product are output from the digital signage display.

19. The method of claim 13, further comprising:
outputting, at the digital signage display, electronic-price tag data of the corresponding product,
wherein the digital signage display included is divided into a plurality of predetermined sections, in row or column units, based upon a method of positioning products on the digital shelf, and
wherein the digital signage display outputs data respective to at least one of the products displayed on the digital shelf corresponding to each of the plurality of predetermined divided sections.

20. The method of claim 19, further comprising:
interfacing with a user terminal recognized within a predetermined range;
receiving at least one of customer information and purchase list information from the interfaced user terminal;
receiving data respective to a product being recognized by the digital shelf, based upon at least one of the customer information and the purchase list information, or receiving data respective to a related product from the database;
decoding the corresponding product data; and
outputting the decoded product data.

* * * * *